US012812296B2

(12) United States Patent
Perkofski et al.

(10) Patent No.: US 12,812,296 B2
(45) Date of Patent: Nov. 24, 2026

(54) MULTI-CHANNEL MICROPHONE

(71) Applicant: Shure Acquisition Holdings, Inc., Niles, IL (US)

(72) Inventors: Ryan Jerold Perkofski, Lake Bluff, IL (US); Steve Sobanski, Skokie, IL (US); Thomas Banks, Skokie, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 119 days.

(21) Appl. No.: 18/228,243

(22) Filed: Jul. 31, 2023

(65) Prior Publication Data

US 2024/0007788 A1 Jan. 4, 2024

Related U.S. Application Data

(63) Continuation of application No. 18/140,294, filed on Apr. 27, 2023, which is a continuation-in-part of application No. 17/676,322, filed on Feb. 21, 2022, now Pat. No. 12,149,913.

(60) Provisional application No. 63/152,262, filed on Feb. 22, 2021.

(51) Int. Cl.

| | |
|---|---|
| ***H04R 3/00*** | (2006.01) |
| ***H04R 1/04*** | (2006.01) |
| ***H04R 5/04*** | (2006.01) |
| ***H04R 29/00*** | (2006.01) |

(52) U.S. Cl.

CPC ............... *H04R 3/005* (2013.01); *H04R 5/04* (2013.01); *H04R 1/04* (2013.01); *H04R 29/008* (2013.01); *H04R 2420/07* (2013.01)

(58) Field of Classification Search

CPC ...... H04R 3/005; H04R 5/04; H04R 2420/07; H04R 29/008; H04R 1/04

See application file for complete search history.

(56) References Cited

U.S. PATENT DOCUMENTS

| | | | | |
|---|---|---|---|---|
| 5,751,819 | A * | 5/1998 | Dorrough | H04R 29/008 381/12 |
| 6,007,228 | A | 12/1999 | Agarwal et al. | |
| 6,317,503 | B1 * | 11/2001 | Mercs | H04S 1/00 84/625 |

(Continued)

FOREIGN PATENT DOCUMENTS

| | | |
|---|---|---|
| CN | 206332831 U | 7/2017 |
| CN | 207340167 U | 5/2018 |

(Continued)

OTHER PUBLICATIONS

Saramonic MixMic Shotgun Microphone with Integrated 2-Channel Audio Adapter, Filmtools, date of publication unknown but, publicly made availble no later than Apr. 11, 2020, 1 page.

(Continued)

*Primary Examiner* — Carolyn R Edwards
*Assistant Examiner* — Kuassi A Ganmavo
(74) *Attorney, Agent, or Firm* — Banner & Witcoff, Ltd.

(57) ABSTRACT

A microphone may digitize multiple analog audio channels into multiple digital audio channels, digitally process the digital audio channels, and output the digital audio channels to another device while maintaining channel separation. The microphone may also include a touch-sensitive user interface that may have multiple live meter modes and a user-selectable color theme.

26 Claims, 21 Drawing Sheets

(56) References Cited

U.S. PATENT DOCUMENTS

| | | | | |
|---|---|---|---|---|
| 6,374,148 | B1 | 4/2002 | Dharmarajan et al. | |
| 6,512,826 | B1 | 1/2003 | Kim | |
| 7,599,836 | B2 | 10/2009 | Ichikawa et al. | |
| 8,111,841 | B2 | 2/2012 | Ibe | |
| 8,180,087 | B2 | 5/2012 | Wu | |
| 9,318,086 | B1 | 4/2016 | Miller | |
| 2004/0069119 | A1 | 4/2004 | Juszkiewicz | |
| 2005/0207596 | A1 | 9/2005 | Beretta et al. | |
| 2006/0034472 | A1 | 2/2006 | Bazarjani et al. | |
| 2006/0152398 | A1 | 7/2006 | Jubien et al. | |
| 2006/0190109 | A1 * | 8/2006 | Kohyama | H04H 60/04 381/11 |
| 2006/0222187 | A1 | 10/2006 | Jarrett et al. | |
| 2007/0223722 | A1 | 9/2007 | Merrey et al. | |
| 2009/0141910 | A1 * | 6/2009 | Mercs | H04S 1/00 381/119 |
| 2009/0154722 | A1 | 6/2009 | De Jong et al. | |
| 2009/0316731 | A1 | 12/2009 | Kong | |
| 2011/0013786 | A1 * | 1/2011 | Odom | H04R 5/04 381/119 |
| 2011/0075864 | A1 | 3/2011 | Hagiwara et al. | |
| 2011/0223896 | A1 | 9/2011 | Gerber | |
| 2011/0285554 | A1 * | 11/2011 | Aghaei | G06F 3/03547 341/20 |
| 2011/0311083 | A1 * | 12/2011 | Bennett | H04R 29/008 381/306 |
| 2012/0114145 | A1 | 5/2012 | Schober | |
| 2012/0300959 | A1 | 11/2012 | Marshall et al. | |
| 2013/0177191 | A1 * | 7/2013 | Waguri | H04R 1/08 381/356 |
| 2013/0201398 | A1 * | 8/2013 | Radin | H03G 5/025 381/1 |
| 2014/0010374 | A1 * | 1/2014 | Kasai | H04R 3/00 381/26 |
| 2014/0056434 | A1 * | 2/2014 | Terai | H04R 29/008 381/58 |
| 2014/0341390 | A1 | 11/2014 | Gudiksen | |
| 2015/0078584 | A1 * | 3/2015 | Moon | H03G 3/04 381/104 |
| 2015/0365752 | A1 | 12/2015 | Mcintosh | |
| 2016/0088426 | A1 | 3/2016 | Halevi et al. | |
| 2016/0253985 | A1 | 9/2016 | Skillings | |
| 2017/0272513 | A1 | 9/2017 | Arrington et al. | |
| 2017/0337914 | A1 | 11/2017 | Stadius et al. | |
| 2018/0039585 | A1 | 2/2018 | Lambert et al. | |
| 2019/0159001 | A1 | 5/2019 | Wang | |
| 2020/0162805 | A1 | 5/2020 | Lesso | |
| 2020/0228895 | A1 * | 7/2020 | Ryle | H04R 29/004 |
| 2020/0233632 | A1 | 7/2020 | Smith | |
| 2020/0233633 | A1 * | 7/2020 | Van der Mee | H04R 1/04 |
| 2020/0350882 | A1 * | 11/2020 | Griffin | H03G 3/32 |
| 2022/0159813 | A1 * | 5/2022 | Justin | G08B 5/36 |

FOREIGN PATENT DOCUMENTS

| | | | | |
|---|---|---|---|---|
| FR | 2832899 | A1 | | 5/2003 |
| JP | S5620344 | A | * | 11/1984 |
| JP | 2004015461 | A | * | 1/2004 |
| JP | 2004312637 | A | * | 11/2004 |
| JP | 4059741 | B2 | | 3/2008 |

OTHER PUBLICATIONS

Is there a hardware-based USB microphone mixer that can take 2 or more USB microphones as input, Quora, date of publication unknown but, made publicly available no later than Apr. 20, 2020, 1 page.

Can You Record with 2 USB Mirophones into 1 Computer, Microphones, date of publication unknown but, made publicly available no later than Apr. 11, 2020, 13 pages.

* cited by examiner

MULTI-CHANNEL MICROPHONE

CROSS-REFERENCE TO RELATED APPLICATIONS

The present application is a continuation of U.S. patent application Ser. No. 18/140,294, filed Apr. 27, 2023, which is a continuation-in-part of U.S. patent application Ser. No. 17/676,322, filed Feb. 21, 2022, which claims priority to U.S. provisional patent application Ser. No. 63/152,262, filed Feb. 22, 2021, each of which is hereby incorporated by reference in its entirety for all purposes.

BACKGROUND

While a variety of microphones are available on the consumer market, it would be desirable to have a microphone with additional features. For example, many existing microphones have connectors that are suitable for only one purpose, and many existing microphones have limited flexibility in manipulating a plurality of simultaneous audio channels. These limitations can limit the consumer.

SUMMARY

The following summary presents a simplified summary of certain features. The summary is not an extensive overview and is not intended to identify key or critical elements.

Examples of a microphone, and methods for operating and implementing the microphone, are described herein. The microphone may comprise any type of microphone, such as but not limited to a unidirectional microphone, a multidirectional microphone, an omnidirectional microphone, a dynamic microphone, a cardioid dynamic microphone, a condenser microphone, or a MEMS microphone.

According to some aspects, the microphone may comprise multiple types of signal connectors, such as one or more USB connectors and/or one or more XLR connectors, which may be usable with a variety of other devices (e.g., Apple Mac computers and portable devices, Windows PC computers and portable devices, Android devices, XLR mixers and interfaces, etc.). Any of the connectors may be used as an input connector, as an output connector, or configured to be switchable between being an input and an output connector. The user of the microphone may be able to conveniently use one or more of the connectors to expand the microphone to become part of a larger setup that uses multiple microphones. For example, the XLR connector of the microphone may be passive, and may be configured such that a user can daisy chain the output from an XLR connector of another microphone into an XLR connector of the microphone. In such an arrangement, an output based on one or both of the microphones may be output through another connector of the microphone, such as a USB connector.

According to further aspects, the microphone may have a first mode (configuration) in which a first connector (e.g., an XLR connector) is configured as an input connector. In this first mode, circuitry of the microphone may selectively mix a signal (e.g., from another microphone) received via the input connector with a signal based on sound detected by the microphone element of the microphone. The mixed signal may be output via a second connector (e.g., a USB connector). Alternatively, the signal received via the input connector and the signal based on sound detected by the microphone element of the microphone may be separately output via the second connector. The microphone may also have a second mode (configuration) in which the first connector is configured as an output connector. In this second mode, the microphone may output via the output connector a signal based on sound detected by the microphone element of the microphone.

For example, the microphone may have a housing that comprises a first connection port and a second connection port. The housing may at least partially enclose a first microphone element, which is configured to produce a first signal in response to sound. The microphone may further include circuitry that is also at least partially enclosed by the housing. The circuitry may be configured to selectively switch between the first mode or in the second mode. In the first mode, the circuitry may provide a second signal, based on the first signal, to the first connection port. In the second mode, the circuitry may produce a third signal based on the first signal and a fourth signal received via the first connection port. The circuitry may provide the third signal to the second connection port. Any of the first, second, third, and fourth signals may be analog or digital signals.

According to further aspects, a microphone may comprise a microphone element and a housing, and the housing may comprise a first connection port and a second connection port. The microphone may further comprise a first preamplifier configured to generate an amplified first analog audio signal based on sound received by the microphone element. The microphone may further comprise a first analog-to-digital converter configured to generate, based on the amplified first analog audio signal, a first digital audio channel. The microphone may further comprise a second preamplifier configured to generate an amplified second analog audio signal based on an analog audio signal received via the first connection port. The microphone may further comprise a second analog-to-digital converter configured to generate, based on the amplified second analog audio signal, a second digital audio channel. The microphone may further comprise a controller configured to process one or both of the first digital audio channel or the second digital audio channel, and to send, via the second connection port, the first digital audio channel and the second digital audio channel as separate channels.

According to further aspects, a method may performed that comprises generating, based on sound received by a microphone element of a microphone, a first analog audio signal. The method may further comprise receiving, via a first connection port of the microphone, a second analog audio signal, amplifying the first analog audio signal, and converting the first analog audio signal to a first digital audio channel. The method may further comprise amplifying the second analog audio signal and converting the amplified second analog audio signal to a second digital audio channel. the method may further comprise processing one or both of the first digital audio channel or the second digital audio channel, and sending, via a second connection port of the microphone, the first digital audio channel and the second digital audio channel as separate channels.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
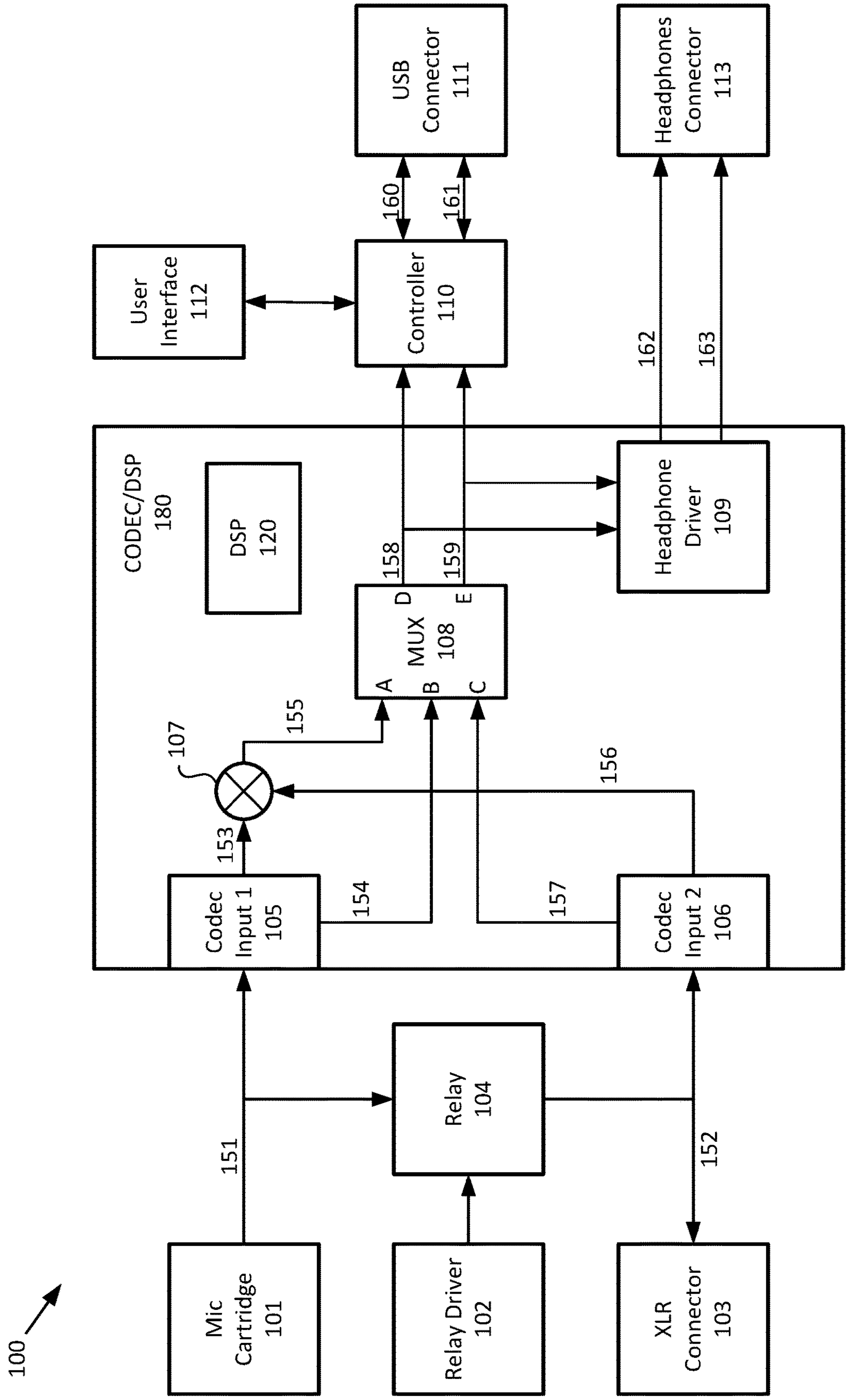
FIG. 1 shows an example block diagram of microphone circuitry in accordance with aspects described herein.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example block diagram of circuitry 100 that may be part of a microphone. Circuitry 100 may include a microphone cartridge 101 that may include one or more microphone elements. The one or more microphone elements may be any type of one or more microphone elements, such as a dynamic element or a condenser element. Microphone cartridge 101 may output in response to detected sound, via a circuit node 151, an electrical signal representing the detected sound to a coder-decoder (codec) input 1(element 105).

Circuitry 100 may also include at least one connector, such as an XLR connection 103, that may provide an electrical signal to a codec input 2 (element 106) received from an external device.

Figure 3A:
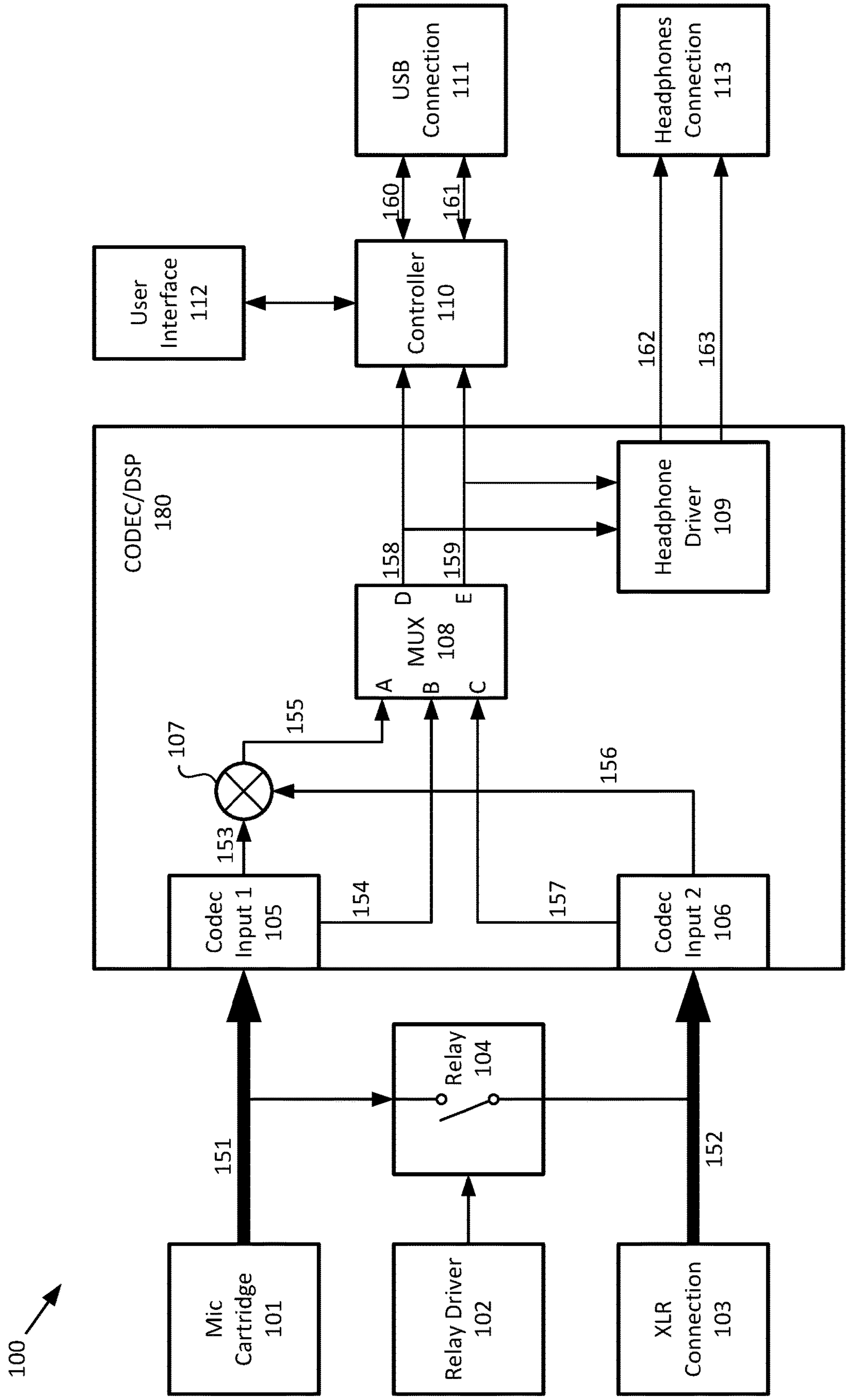
FIGS. 3A-3F show example configurations of the microphone of FIG. 1 in accordance with aspects described herein.
Figure 3B:
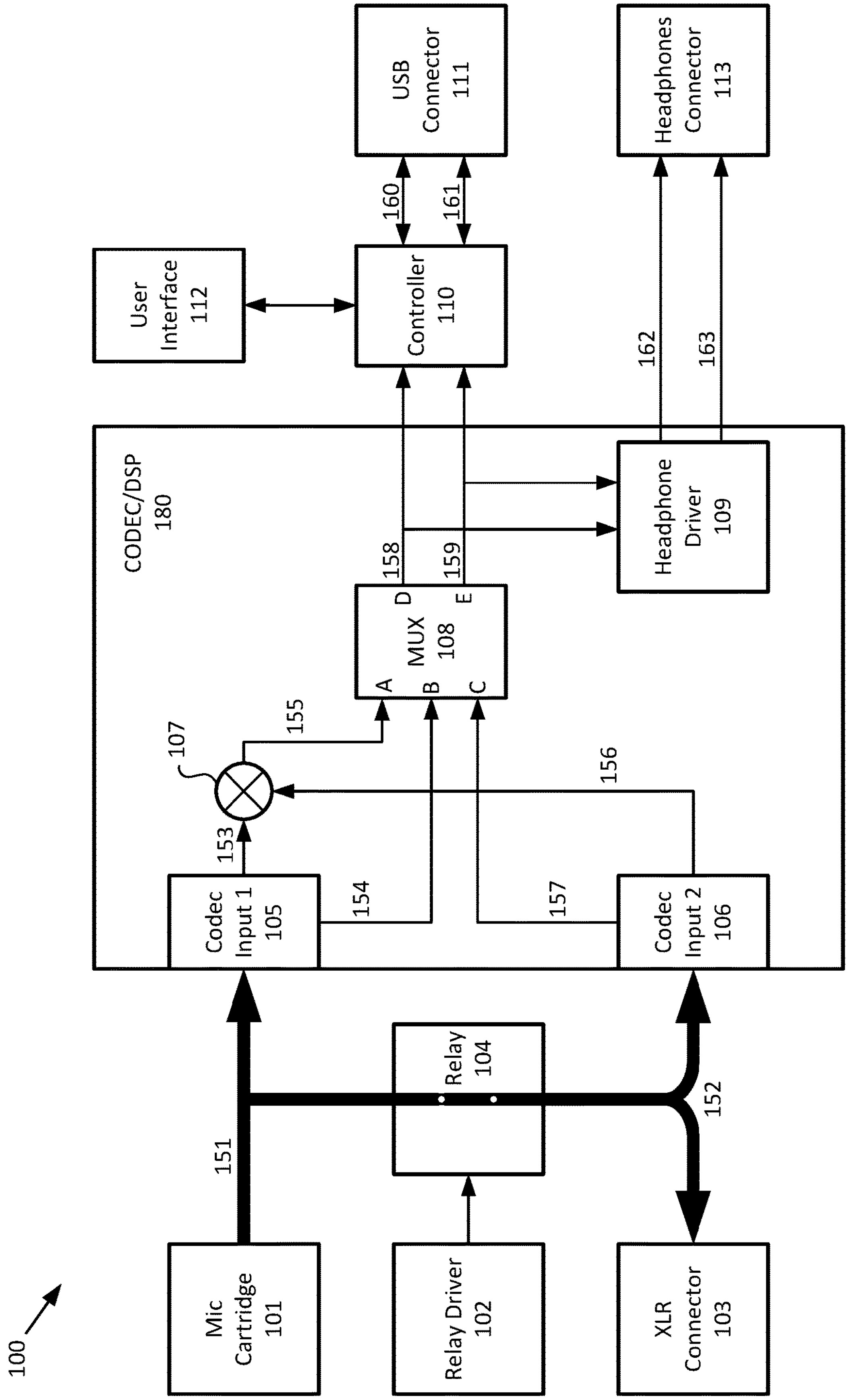

Circuitry 100 may also include a relay driver 102 and a relay 104, in which the relay driver 102 may be configured to selectively cause relay 104 to switch between a first state and a second state. In the first state, relay 104 may electrically disconnect circuit node 151 from circuit node 152 such that the electrical signal output by microphone cartridge 101 is received by codec input 1, but not by XLR connection 103 or by codec input 2. In the first state, therefore, the output of microphone cartridge 101 may be received by codec input 1 (and not by codec input 2 and/or not by XLR connection 103), and a signal from XLR connection 103 may be received by codec input 2. An example signal flow in the first state is shown in FIG. 3A. In the second state, relay 104 may electrically connect circuit node 151 with circuit node 152, such that the electrical signal output by microphone cartridge 101 passes through relay 104 and is thus received not only by codec input 1, but also by XLR connection 103 and/or codec input 2. Moreover, in the second state, XLR connection 103 may or may not still be connected with codec input 2. An example signal flow in the second state is shown in FIG. 3B.

Codec input 1 and codec input 2 may be part of a same integrated device, such as a codec and/or digital signal processor (DSP) 180. Codec/DSP 180 may also include a mixer 107, a multiplexer (MUX) 108, and/or a headphone driver 109 (which may be connected to a headphone connection 113 such as a 3.5 mm TRRS connector). Alternatively, one or more of these elements 105-109 may be part of a separate device (e.g., a separate integrated circuit or other type of circuitry).

Circuitry 100 may also include at least one controller 110 such as a microcontroller unit (MCU), which may be connected with a user interface 112 and/or one or more physical connectors such as a universal serial bus (USB) connection 111.

Any portion of circuitry 100 may be implemented, for example, as one or more programmable gate arrays (PGAs), one or more application-specific integrated circuits (ASICs), one or more commercial off-the-shelf integrated circuits, and/or any other types of circuitry. For example, codec/DSP 180 and/or controller 110 each may be implemented as one or more PGAs chips, one or more ASICs, one or more processors, a non-transitory computer-readable medium such as one or more memories storing instructions for execution by the one or more processors, etc.

In the shown example, codec input 1 may receive, via electrical node 151, an electrical signal from microphone cartridge 101, such as an analog electrical signal, that is generated in response to sound detected by microphone cartridge 101. Codec input 1 may include an analog-to-digital converter (ADC) that converts the received analog electrical signal into a digital signal. The generated digital signal may be forwarded, via electrical node 153, to mixer 107. The generated digital signal from codec input 1 may also be forwarded, via electrical node 154, to a first input of multiplexer 108 (in this example, input B of multiplexer 108).

Similarly, in the shown example, codec input 2 may receive, via electrical node 152, an electrical signal from XLR connection 103 and/or from microphone cartridge 101, such as an analog electrical signal. Codec input 2 may also include an ADC (which may be the same ADC as for codec input 1) that converts the analog electrical signal received by codec input 2 into a digital signal. The digital signal produced in response to the analog signal received by codec input 2 may be forwarded, via electrical node 156, to a second input of mixer 107. The generated digital signal from codec input 2 may also be forwarded, via electrical node 157, to another input of multiplexer 108 (in this example, input C of multiplexer 108).

Mixer 107 may be a digital mixer and may selectively mix the digital signals received via electrical nodes 153 and 156 to produce a digital signal that is provided to a third input of multiplexer 108 (in this example, input A of multiplexer 108) via an electrical node 155. Mixer 107 may selectively mix the input digital signals in any of a plurality of ways. For example, mixer 107 may generate the digital signal on electrical node 155 to be based on any desired ratio of the two input signals on electrical nodes 153 and 156, such as mixing them at 50% each (50/50 ratio), or one at 25% and the other at 75% (25/75 or 75/25 ratio), one at 10% and the other at 90% (10/90 or 90/10 ratio), or even one at 0% and the other at 100% (a 0/100 or 100/0 ratio). These ratios are merely examples, and any other values may be used. Thus, for example, if mixer 107 is configured to mix the two inputs at a 50/50 ratio, then the signal at electrical node 155 may be generated by mixing the inputs at electrical nodes 153 and 156 using equal weighting. Or, if mixer 107 is configured to mix the two inputs at a 25/75 ratio, then the signal at electrical node 155 may be generated by mixing the inputs at electrical nodes 153 and 156 in which one of the inputs is weighted at 25% and the other of the inputs is weighted at 75%. Mixer 107 may be a single-channel mixer or a multi-channel (e.g., stereo) mixer. In other words, where mixer 107 is a single-channel mixer, output node 155 may carry only a single (mono) audio channel. Where mixer 107 is a multi-channel mixer, output node 155 may actually be two or more physical electrical nodes each carrying a different one of the multiple channels (e.g., a left audio channel and a right audio channel).

Multiplexer 108 may be configured to selectively multiplex any one or more of a plurality of inputs (e.g., inputs A, B, and/or C) such that the signals received at any one or more of the inputs are selectively output by any one or more of a plurality of outputs (e.g., outputs D and/or E). Where two outputs are used, outputs D and E may be considered to be, respectively, a left audio channel and a right audio channel. The left and right audio channels may be sent, via electrical nodes 158 and 159, to inputs of controller 110 and/or to inputs of headphone driver 109. Multiplexer 108 may or may not be included in circuitry 100. Where multiplexer 108 is not included, the output (node 155) of mixer 107 may be connected directly to node 158 and/or node 159. For example, where mixer 107 is a stereo mixer, node 155 may actually be two physical electrical nodes, one of which is connected to node 158 (e.g., left audio channel) and the other of which is connected to node 159 (e.g., right audio channel), with or without an intervening multiplexer 108 making the connections.

User interface 112 may include any one or more devices with which the user of the microphone may interact. For example, user interface 112 may include one or more buttons, switches, sliders, and/or touch sensors. User interface 112 may also include one or more drivers that interface with controller 110 so that user inputs via user interface 112 may be communicated as signals to controller 110. User interface 112 may be at least partially accessible by the user from outside a body (e.g., housing) of the microphone. User interface 112 may also provide information to the user, such as in the form of a display, one or more lights (e.g., light-emitting diodes), and/or a haptic feedback motor. The information provided to the user via user interface 112 may be controlled by controller 110.

Codec/DSP 180 may also comprise circuitry for processing audio, for example one or more equalizers such as a high pass/presence boost equalizer and/or a mode equalizer, a de-esser, a bass equalizer such as a bass tamer (which may be used to reduce the proximity effect), a limiter, a compressor, and/or an automatic level control (ALC). This digital signal processing functionality is schematically indicated in FIG. 1 as DSP 120. DSP 120 may be connected anywhere in the audio signal chain. For example, DSP 120 may perform digital signal processing on audio signals in any one or more of nodes 153-159.

Figure 2:
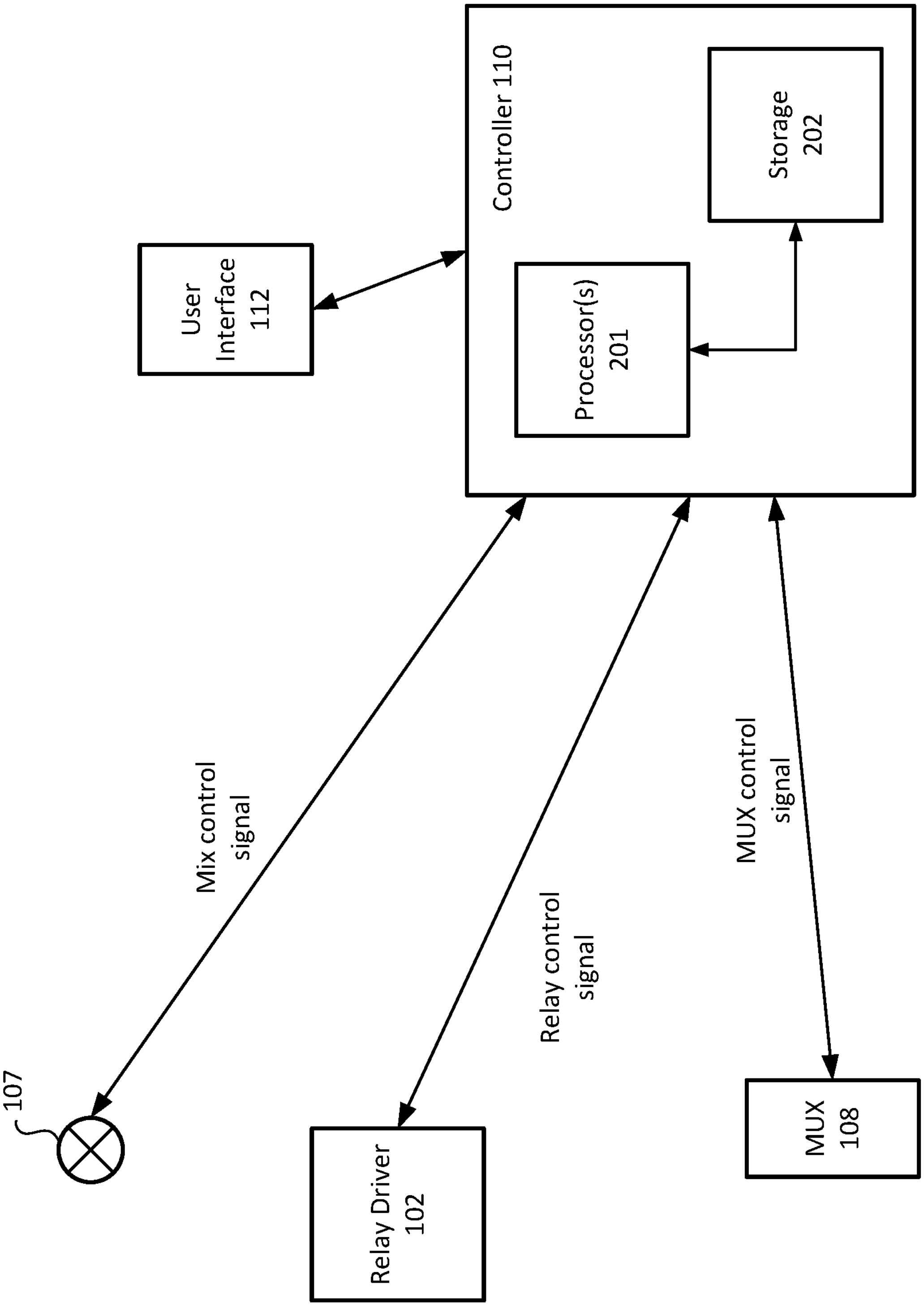
FIG. 2 shows an example of elements of the microphone of FIG. 1 that may be controlled by the microphone's controller in accordance with aspects described herein.

Referring to FIG. 2, controller 110 may control, and/or communicate uni-directionally or bi-directionally with, one or more elements of circuitry 100, as indicated by the arrows connecting controller 110 with relay driver 102, mixer 107, multiplexer 108, and user interface 112. For example, controller 110 may send a relay control signal to relay driver 102 indicating, or otherwise being associated with, which state relay 104 should be in, thereby controlling whether relay 104 is in the above-described first state or second state. In response to the relay control signal, relay driver 102 may control relay 104 to be in the first state or the second state, such as by selectively applying an appropriate current to relay 104 to cause a circuit within relay 104 to close or open, thereby connecting or disconnecting node 151 with node 152. Controller 110 may further send a mix mode control signal to mixer 107 indicating a mix mode. For example, the mix mode control signal may identify, or otherwise be associated with, a particular mixing ratio between the signals that mixer 107 receives from codec 1 and codec 2. Mixer 107 may adjust the mixing mode in accordance with the mix control signal. Controller 110 may also send a MUX control signal to multiplexor 108 that indicates, or otherwise is associated with, a particular multiplexing mode. Multiplexor 108 may apply the multiplexing mode based on the MUX control signal. For example, the MUX control signal may indicate that input A of multiplexor 108 is to be connected to outputs D and E. Or, for example, the MUX control signal may indicate that input B is to be connected to output E and input C is to be connected to output E. MUX control signal may indicate any multiplexor input/output connections as desired. Some examples of multiplexor input/output connections are described below with reference to FIGS. 3C-3E.

Controller 110 may send any of the mix control signal, the relay control signal, and/or the MUX control signal based on a user input received from user interface 112. Controller 110 may additionally or alternatively send any of the mix control signal, the relay control signal, and/or the MUX control signal based on an algorithm executed by controller 110, either based on or independent from any user inputs received from user interface 112. For example, controller 110 may comprise one or more processors 201. Controller 110 may further comprise storage 202, which may comprise a non-transitory computer-readable medium, such as one or more memories, that stores instructions for performing the algorithm in order to perform any of the functions described herein attributed to controller 110. The one or more processors 201 may execute the stored instructions to perform these functions. In further examples, some or all of the functionality of controller 110 may be additionally or alternatively implemented as hard-wired circuitry and/or as firmware.

FIG. 3A shows an example configuration of circuitry 100, in which relay 104 is in the above-described first state, such that relay 104 does not electrically connect node 151 with node 152. As indicated in FIG. 3A by the thicker arrows, a signal from microphone cartridge 101 may be received by codec input 1, and a signal from XLR connection 103 may be received by codec input 2. In this first state, XLR connection 103 may act as an input connection that receives signals from an external device connected to circuitry 100 via XLR connection 103. Relay 104, and any other circuitry as desired, may be configured to achieve the first state in response to one or more control signals received by controller 110. For example, controller 110 may send a relay control signal to relay driver 102 (such as shown in FIG. 2), which in response may cause relay 104 to switch to the first state (e.g., by opening relay 104).

FIG. 3B shows an example configuration of circuitry 100, in which relay 104 is in the above-described second state, such that relay 104 electrically connects node 151 with node 152. As indicated in FIG. 3B by the thicker arrows, a signal from microphone cartridge 101 may be received by codec input 1, by codec input 2, and by XLR connection 103. In this second state, XLR connection 103 may act as an output connection that sends signals from microphone cartridge 101 to an external device connected to circuitry 100 via XLR connection 103. Relay 104, and any other circuitry as desired, may be configured to achieve the second state in response to one or more control signals received by controller 110. For example, controller 110 may send a relay control signal to relay driver 102 (such as shown in FIG. 2), which in response may cause relay 104 to switch from the first state to the second state (e.g., by closing relay 104) or from the second state to the first state (e.g., by opening relay 104). As another example, the second state may be the default unpowered state of relay 104, which may allow microphone cartridge 101 to function as a passive microphone outputting to XLR connector 103 (and/or any other desired connector) when circuitry 100 is unpowered. For example, relay 104 may be a normally-closed (NC) relay, and may comprise a spring that biases a switch contact point within relay 104 to be in the closed (second) state by default when unpowered by relay driver 102. Circuitry 100 may be selectively switched back and forth, as desired, between the first state (such as in FIG. 3A) and the second state (such as in FIG. 3B).

Figure 3C:
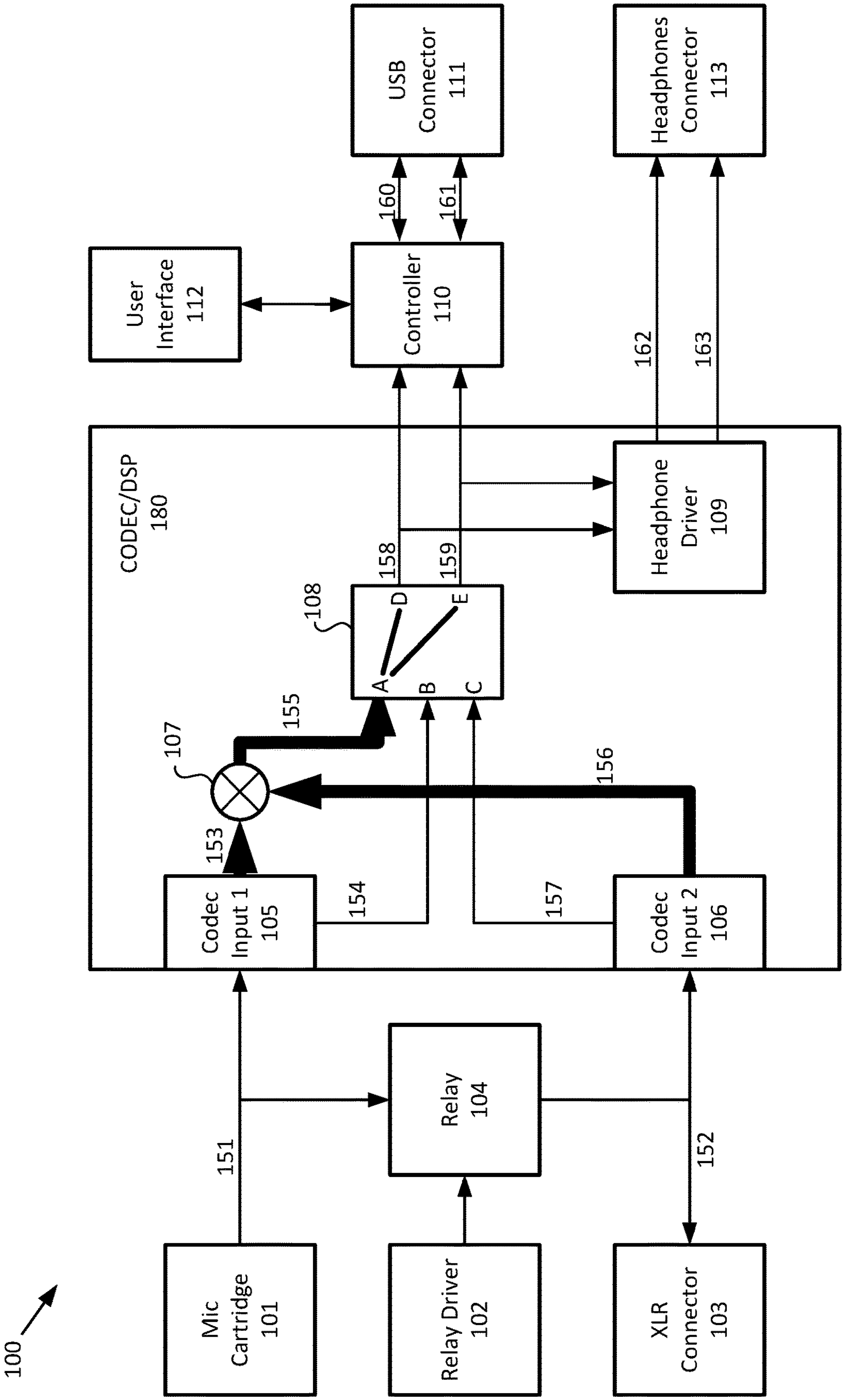

FIGS. 3C-3F show various example configurations of Codec/DSP 180, in which mixer 107 and multiplexer 108 are configured in various ways to combine and multiplex audio signals from codec input 1 and codec input 2. In particular, FIG. 3C shows an example configuration in which mixer 107 is configured to combine audio signals from codec input 1 and codec input 2 to produce a signal at node 155 that is provided to input A of multiplexer 108. In such a configuration, the audio signals from codecs 1 and 2 (which may be digital audio signals) may be combined together using any algorithm and using any weights. For example, the signal output by mixer 107 at node 155 may be a weighted average of the audio signals from codec inputs 1 and 2, according to the following relationship: MixOut=X*Codec1+Y*Codec2, where MixOut is the audio signal output by the mixer 107 at node 155, Codec1 is the audio signal provided by codec input 1 at node 153, Codec2 is the audio signal provided by codec input 2 at node 156, and X and Y are any desired amplitude values in the range of from zero to one, inclusive, to achieve a desired mixing ratio (e.g., a mixing ratio of X/Y or Y/X). Where the audio signals are digitally encoded, the actual combining algorithm implanted may take the encoding into account to mix the two signals in the desired mixing ratio. FIG. 3C also shows an example configuration of multiplexer 108 in which input A is multiplexed to (e.g., distributed to) both output D and output E (as indicated by the lines conceptually showing connections from input A to outputs D and E). In such a configuration, where outputs D and E respectively correspond to left and right audio channels, the audio output by multiplexer 108 may be in mono mode in which both left and right audio channels are identical.

Figure 3D:
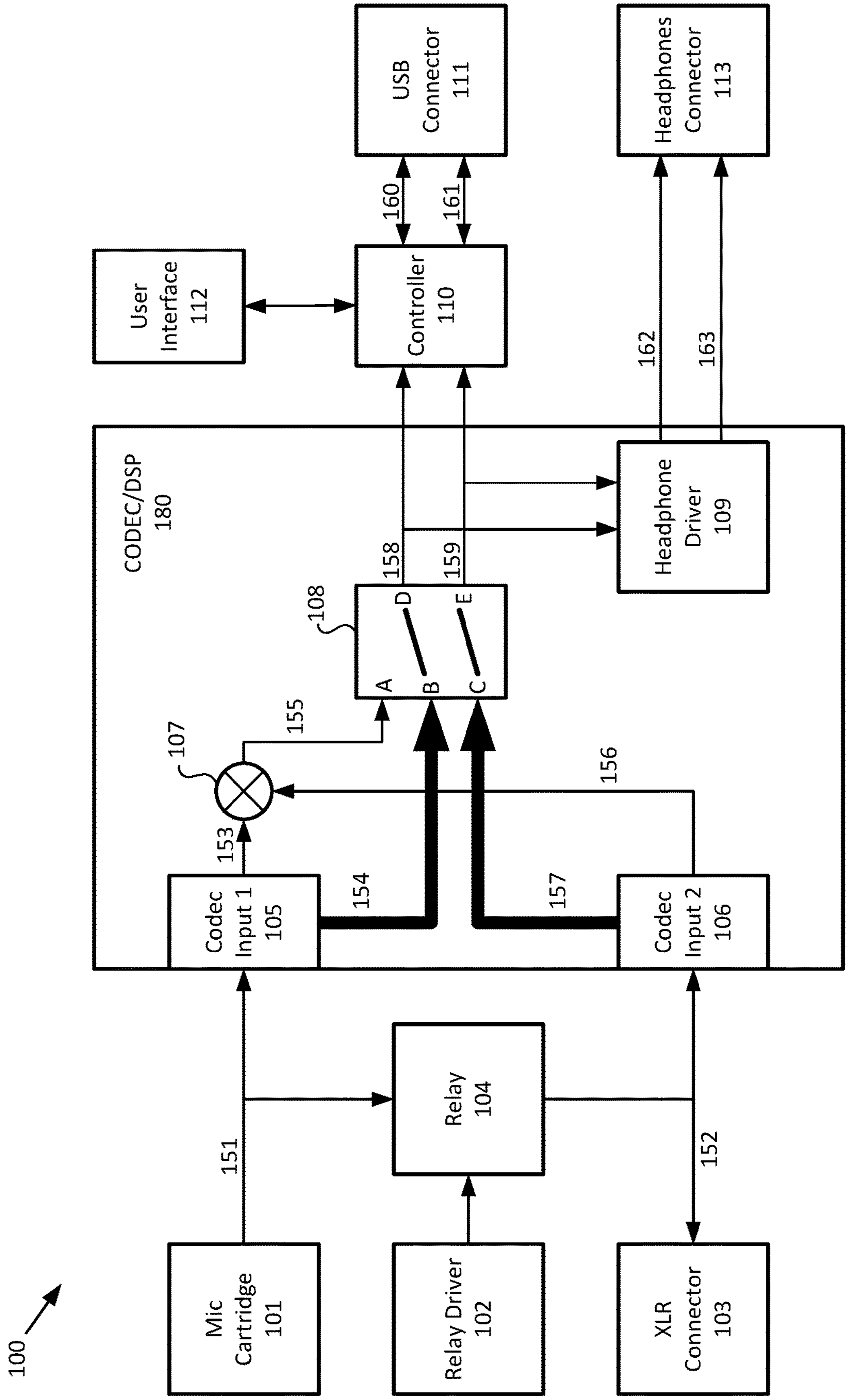

FIG. 3D shows another example configuration in which mixer 107 is bypassed and instead codec input 1 and codec input 2 are directly provide to inputs B and C, respectively, of multiplexer 108. In this particular configuration codec input 1 may provide audio for the left audio channel (at output D/node 158) and codec input 2 may provide audio for the right audio channel (at output D/node 159).

Figure 3E:
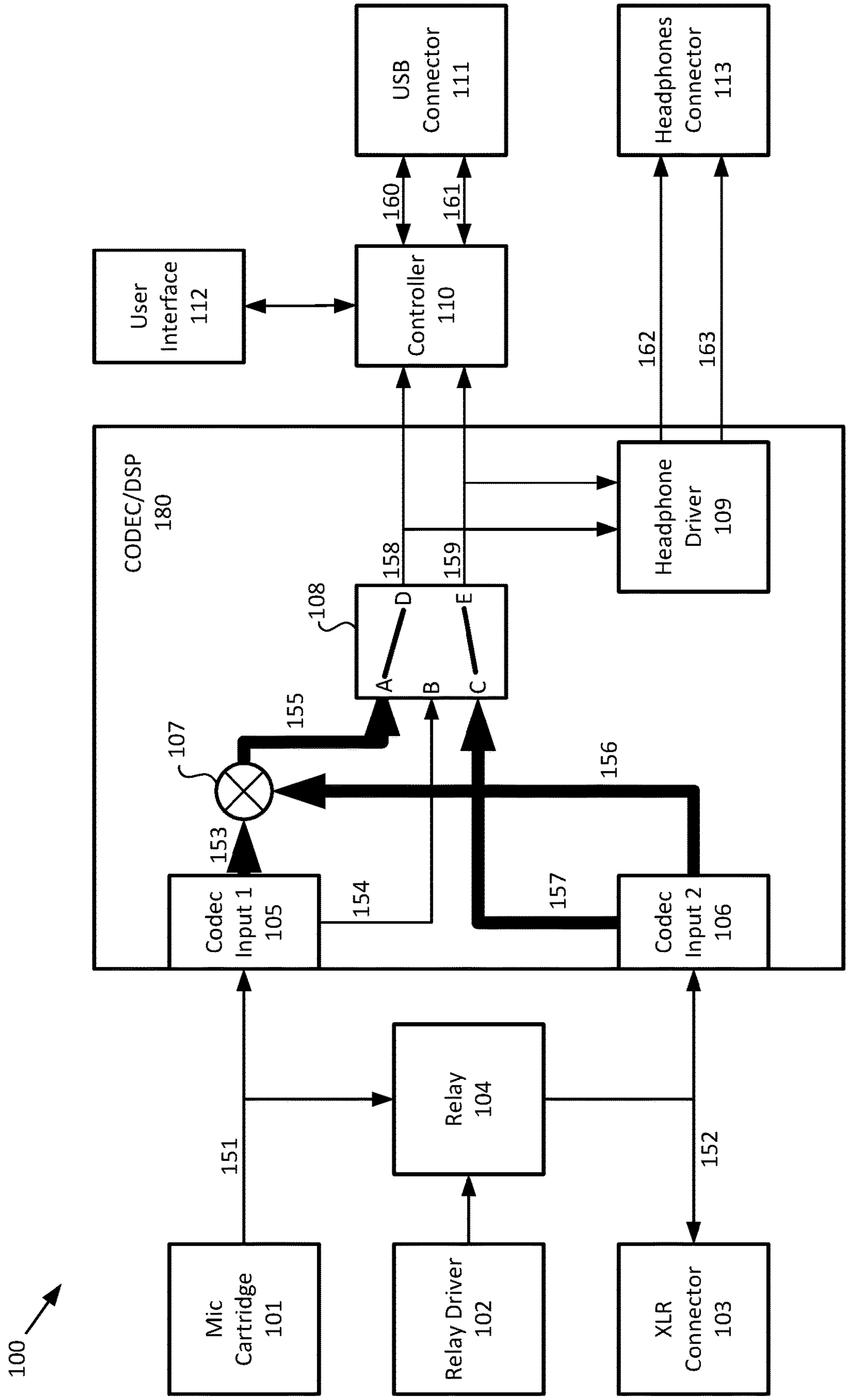

FIG. 3E shows another example configuration in which mixer 107 mixes audio signals received from codec input 1 and codec input 2 (which may be mixed, for example, in the manner described above for FIG. 3C) and outputs the resulting mixed signal into multiplexer input A. This mixed audio signal may be passed through to output D of multiplexer 108 (e.g., as the left audio channel). At the same time, the audio signal from codec input 2 may also be provided to multiplexer input C, which may be passed to multiplexer output E (e.g., as the right audio channel).

Figure 3F:
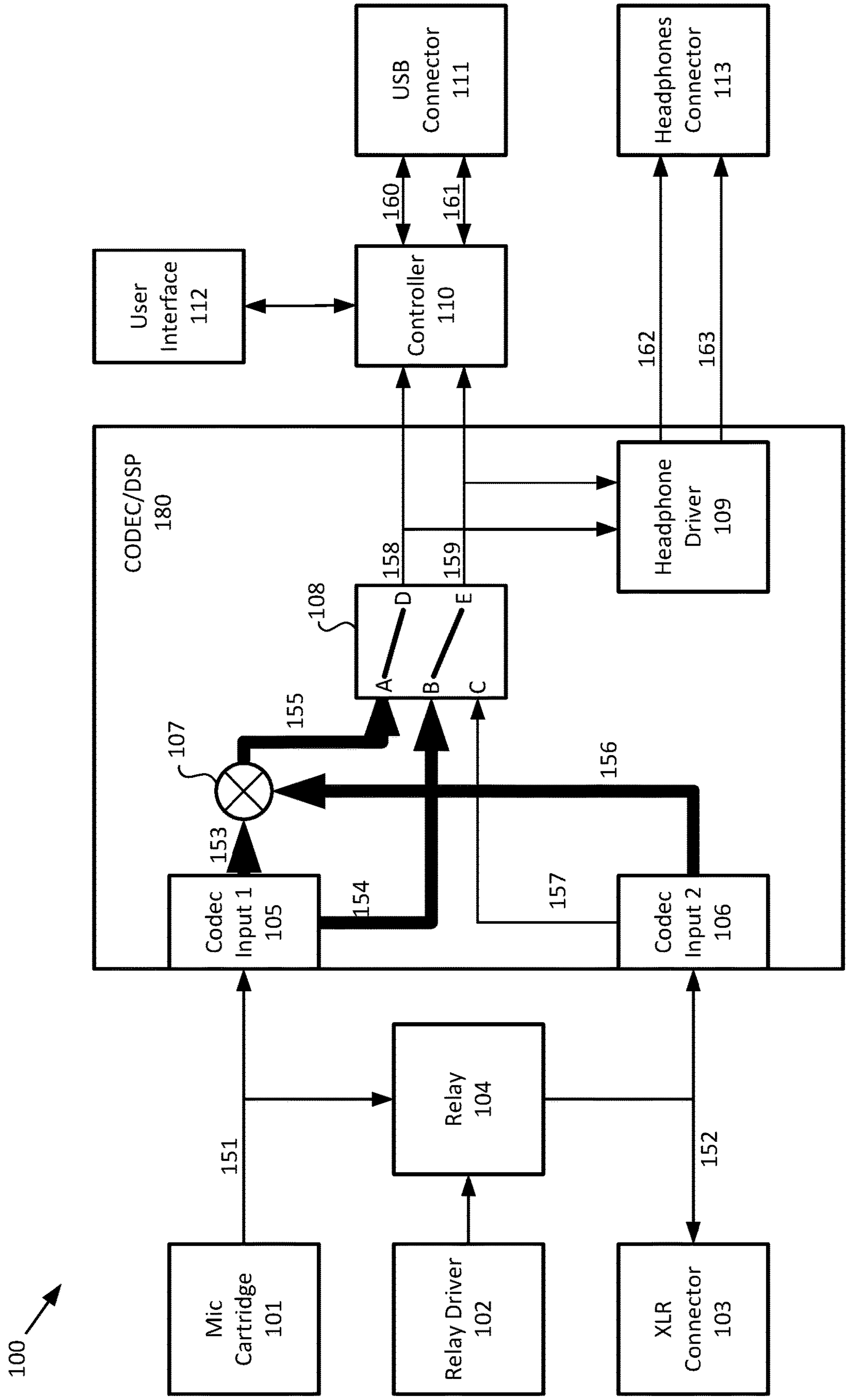

FIG. 3F shows another example configuration in which mixer 107 mixes audio signals received from codec input 1 and codec input 2 (which may be mixed, for example, in the manner described above for FIG. 3C) and outputs the resulting mixed signal into multiplexer input A. This mixed audio signal may be passed through to output D of multiplexer 108 (e.g., the left audio channel). At the same time, the audio signal from codec input 1 (via node 154) may also be provided to another multiplexer input B, which may be passed to another multiplexer output E (e.g., as the right audio channel). Alternatively, at the same time that signals are being mixed by mixer 107, the audio signal from codec input 2 (via node 157) may be provided to another multiplexer input B, which may be passed to multiplexer output E (e.g., as the right audio channel).

FIGS. 3C-3F indicate only a subset of the possible configurations of Codec/DSP 180 and are not intended to be limiting. Codec input 1 105, codec input 2 106, mixer 107, and multiplexer 108 may be configured to provide any desired interconnections amongst these elements, and to achieve any desired mixing of audio signals therein, as desired. Moreover, any configuration of Codec/DSP 180 may be combined with any configuration of other portions of circuitry 100. For example, relay 104 may be in either state (as shown in FIGS. 3A and 3B) in combination with any of the configurations of Codec/DSP 180, to achieve a desired set of audio inputs, audio outputs, and mixing and multiplexing thereof.

Figure 4:
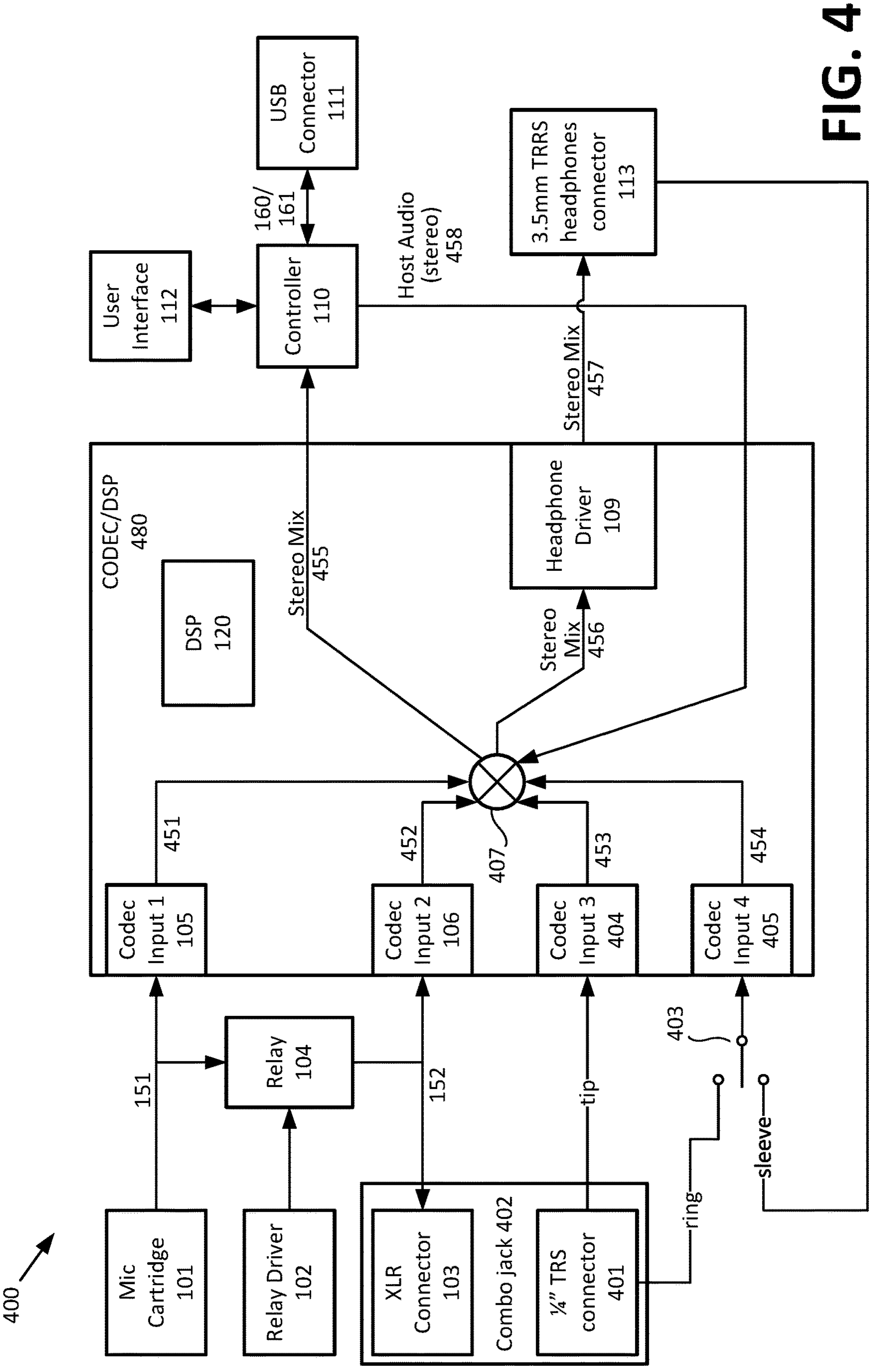
FIG. 4 shows another example block diagram of microphone circuitry in accordance with aspects described herein.

FIG. 4 shows another example block diagram of circuitry 400 that may be part of a microphone. Circuitry 400 may comprise one or more of the elements of circuitry 100 (FIG. 1), for example microphone cartridge 101, relay driver 102, XLR connector 103, relay 104, codec input 1 105, codec input 2 106, headphone driver 109, controller 110, USB connector 111, user interface 112, and/or headphones connector 113. Each of these elements may operate in the same way, or in substantially the same way, as described above with reference to FIGS. 1, 2, and 3A-3F.

Circuitry 400 may further comprise a Codec/DSP 480, which may be, for example, Codec/DSP 180 configured in a different way. Codec/DSP 480 may comprise one or more codec inputs in addition to codec input 1 and codec input 2. For example, codec/DSP 480 may comprise four codec inputs, five codec inputs, six codec inputs, or more. In the shown example, codec/DSP 480 comprises four codec inputs: codec input 1 105, codec input 2 106, codec input 3 404, and codec input 4 405.

XLR connector 103 may be part of a combo (combination) jack 402 along with another type of connector such as a quarter-inch tip-ring-sleeve ("TRS") connector 401. Where headphone connection 113 comprises a TRRS connector, the tip node of TRS connector 401 may provide an input to codec input 3, and the ring node of TRS connector 401 and the sleeve node of TRRS connector 113 may selectively provide an input to codec input 4, depending upon the state of a switch 403. In a first state of switch 403, the ring node of TRS connector 401 may connect to codec input 4, and in a second state of switch 403, the sleeve node of TRRS connector 113 may connect to codec input 4. The state of switch 403 may be controlled by controller 110 based on which type of connector is providing an input signal, i.e., based on whether controller 110 detects the presence of a quarter-inch TRS input or a 3.5 mm TRRS configured input (via 3.5 mm TRRS headphones connector 113). The 3.5 mm connector and the quarter-inch connector may be independent to each other and may be populated at the same time. These type of connectors often have mechanical switches to indicate that a connector is inserted. Combo jack 402 may be an XLR quarter-inch combo jack in which, for example, either an XLR connector or a quarter-inch connector can be populated at once.

For simplicity and ease of viewing, FIG. 4 schematically represents certain stereo audio signals or nodes as a single line, such as stereo mix 455, stereo mix 456, stereo mix 457, and host audio 458. Each of these stereo mixes may comprise two audio channels: a left channel and a right channel. The host audio signal (line 458) may be generated by controller 110 based on signals received via nodes 160 and 161 and via USB connector 111 from another device.

Codec/DSP 180 may also include a mixer and/or a multiplexer, similar to elements 107 and 108 in FIG. 1. For example, FIG. 4 shows a mixer 407, which may be, or may be similar to, mixer 107. While a multiplexer is not explicitly shown in FIG. 4 (for simplicity and ease of viewing), mixer 407 may comprise both a mixer function and a multiplexer function, such as the same type of multiplexing as performed by MUX 108.

Like mixer 107, mixer 407 may comprise a digital mixer and may selectively mix the digital signals received via electrical nodes/lines 451, 452, 453, 454, and/or 458 to produce one or more digital signals (e.g., stereo mixes via lines 455 and/or 456). Mixer 407 may selectively mix the input digital signals in any of a plurality of ways. For example, mixer 407 may generate an output digital signal to be based on any desired ratio of the two or more input signals, such as mixing them in some specific ratio (e.g., a 50/50 ratio or a 25/75 ratio for two input signals, or a 25/25/50 ratio or a 40/35/25 ratio for three input signals). These ratios are merely examples, and any other values from 0% to 100% may be used.

Thus, mixer 407 may receive any one or more audio signals via any one or more of nodes/lines 451-454 and/or 458, mix and/or otherwise combine them as desired, and output one or more resulting audio signals via nodes/lines 455 and/or 456. For example, mixer 407 may provide a left channel of a stereo mix based on any one of the codec inputs (e.g., codec input 1) and a right channel of the stereo mix based on any other of the codec inputs (e.g., code input 3). As another non-limiting example, mixer 407 may provide a left channel a stereo mix based on any two or more of the codec inputs (e.g., codec input 1 mixed in a first way with codec input 3) and a right channel of the stereo mix based on any one or more of the codec inputs (e.g., code input 2 mixed in a second way with codec input 3). In these examples or in any other configuration, the left and/or right channels produced by mixer 407 may be additionally or alternatively based on the host audio (line 458) received from controller 110. Thus, the stereo mix generated by mixer 407 may be based on any one or more of the codec inputs 1-4 and/or based on the host audio (line 458) provided by an external device via USB connector 111.

If a multiplexer were schematically shown as separate from mixer 407 in FIG. 4, such a multiplexer may be schematically shown as having two or more inputs that receive outputs from any or all of codecs 1-4, from host audio (line 458), and/or that receives any other desired intermediary signals generated by mixer 407. Such a multiplexer may also be schematically shown as being configured to selectively multiplex any of those inputs in any combination or subcombination to produce one or more outputs, which may be output to stereo mixes in lines 455 and/or 456.

Codec/DSP 480 may also comprise DSP 120. DSP 120 may be connected anywhere in the audio signal chain. For example, DSP 120 may perform digital signal processing on audio signals in any one or more of nodes/lines 451-456 and/or 458.

Like circuitry 100, any portion of circuitry 400 may be implemented, for example, as one or more PGAs, one or more ASICs, one or more commercial off-the-shelf integrated circuits, and/or any other types of circuitry. For example codec/DSP 480 and/or controller 110 each may be implemented as an integrated circuit chip.

Figure 5:
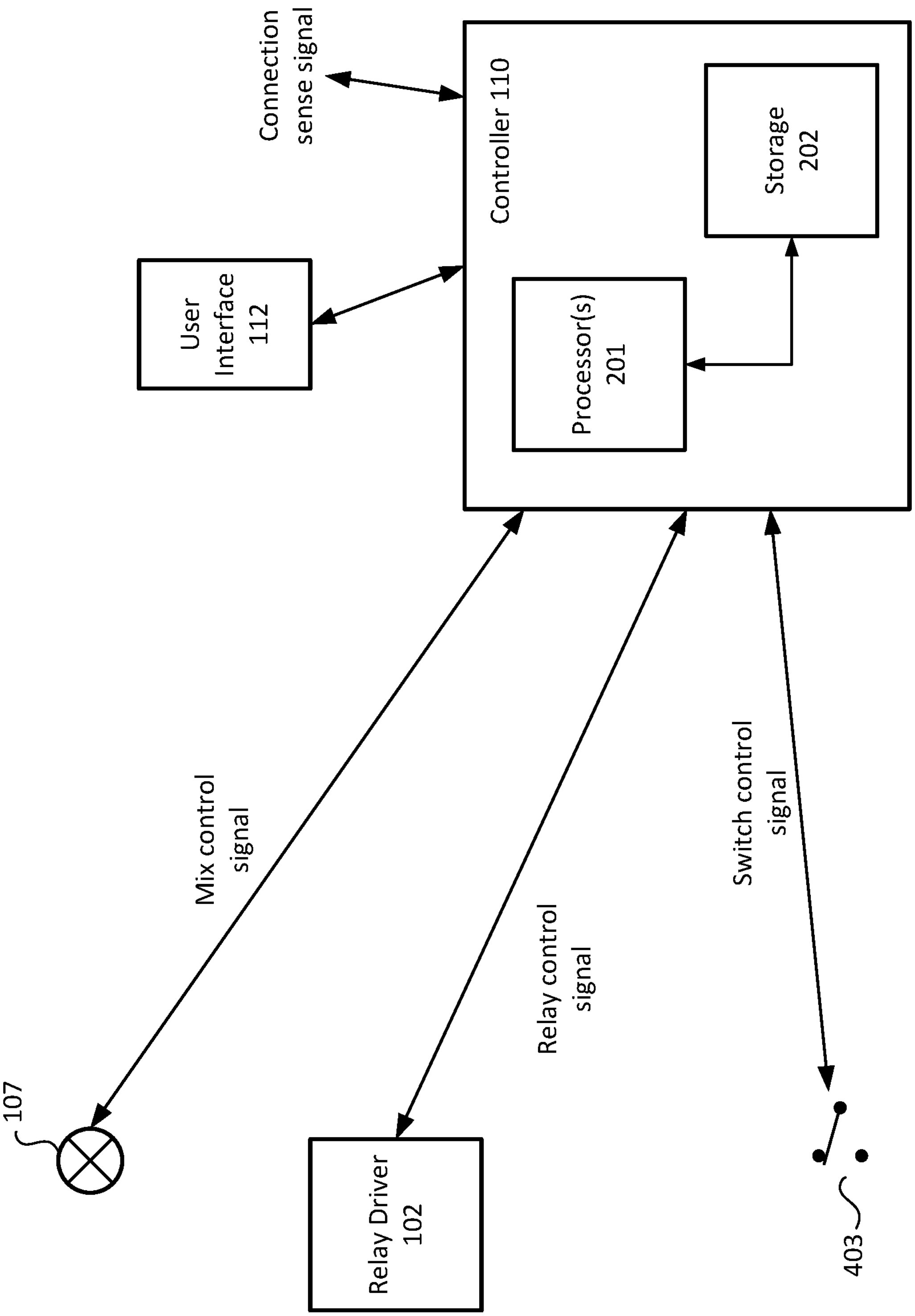
FIG. 5 shows an example of elements of the microphone of FIG. 4 that may be controlled by the microphone's controller in accordance with aspects described herein.

Referring to FIG. 5, controller 110 may control, and/or communicate uni-directionally or bi-directionally with, one or more elements of circuitry 400, as indicated by the arrows connecting controller 110 with relay driver 102, mixer 407, switch 403, and user interface 112. As previously discussed with regard to circuitry 100, controller 110 as part of circuitry 400 may send a relay control signal to relay driver 102 indicating, or otherwise being associated with, which state relay 104 should be in, thereby controlling whether relay 104 is in the above-described first state or second state. In response to the relay control signal, relay driver 102 may control relay 104 to be in the first state or the second state, such as by selectively applying an appropriate voltage to relay 104 to cause a circuit within relay 104 to close or open, thereby connecting or disconnecting node 151 with node 152. Controller 110 may further send a mix mode control signal to mixer 407 indicating a mix mode and/or a multiplexing configuration. For example, the mix mode control signal may identify, or otherwise be associated with, a particular mixing ratio between the signals that mixer 407 receives from codec 1, codec 2, codec 3, codec 4, and/or host audio (via line 458). Mixer 407 may adjust the mixing mode in accordance with the mix control signal. Mix control signal may also indicate a multiplexing mode that indicates, or is otherwise associated with, which signals received by mixer 407 and/or generated by mixer 407 are to be multiplexed, and how they are to be multiplexed prior to outputting as stereo mixes 455 and/or 456. Mixer 407 may apply the multiplexing mode based on the mix control signal. For example, the mix control signal may indicate that one or more particular inputs of the multiplexing portion of mixer 407 is to be connected with one or more outputs of mixer 407.

Figure 9:
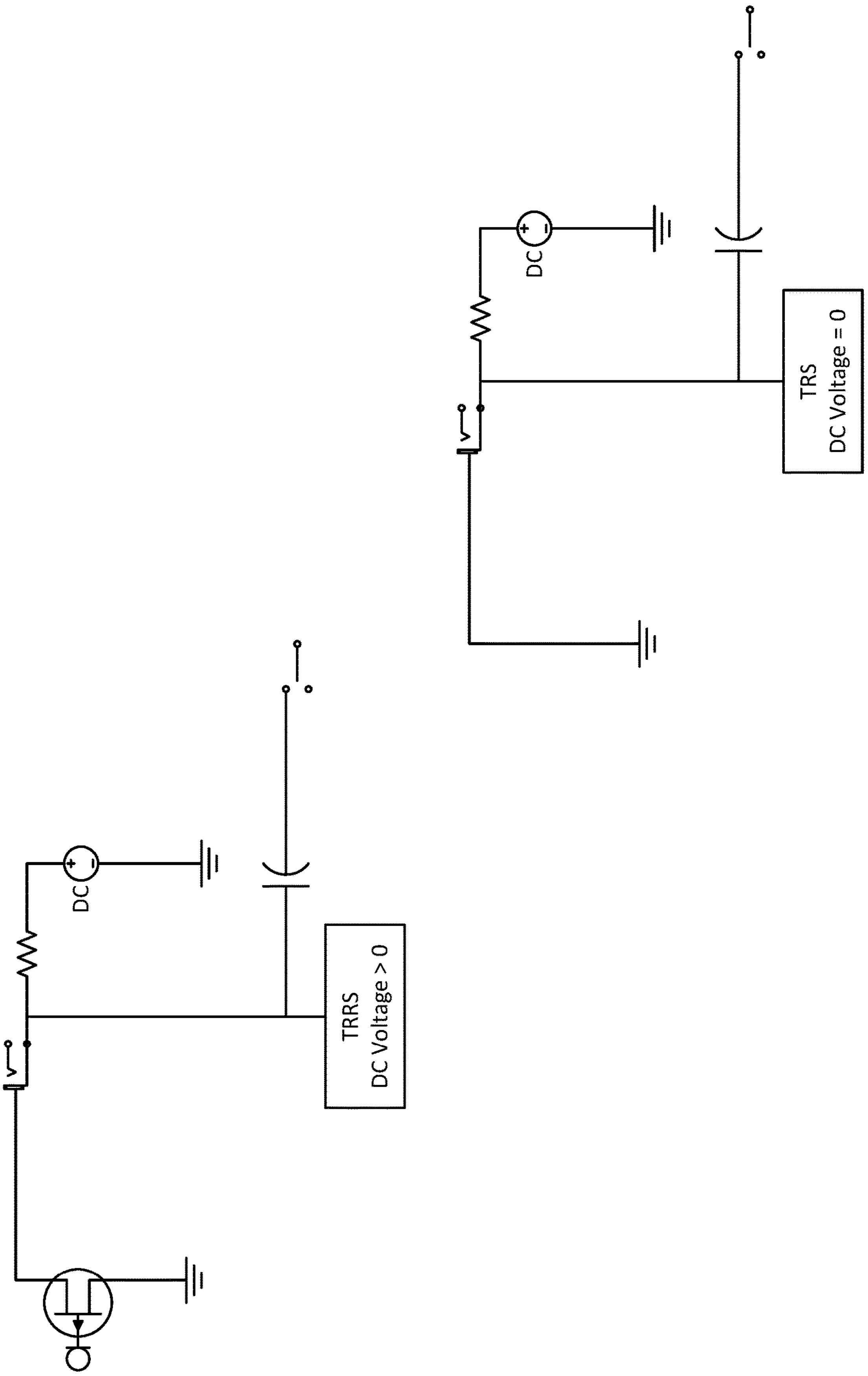
FIG. 9 shows schematics of example circuitry that may be used to determine whether a TRRS connector is connected to the microphone and whether a TRS connector is connected to the microphone in accordance with aspects described herein.

Controller 110 may further determine which type of connector is plugged into combo jack 402. For example, circuitry 400 may receive a connection sense signal that is indicative of whether combo jack 402 is receiving a quarter-inch TRS connector or headphone connection 113 is receiving a 3.5 mm TRRS connector from an external device. The connection sense signal may comprise one or more signals actively received from the external device via the sleeve or tip nodes, and/or it may be one or more separately generated signals such as from a sensor that physically senses the type of connector being plugged in. For example, FIG. 9 shows schematics of example circuitry that may be used by controller 110 to indicate whether a TRRS connector is inserted or a TRRS connector is inserted. A similar principle may be used for determining whether the inserted quarter-inch connector is a TRS connector or a TS connector. The voltage at the "sleeve" pin of 3.5 mm TRRS or "ring" of the quarter-inch jack may be measured via, for example, a comparator or other voltage sensing circuitry. The output(s) of the comparator(s) and/or other voltage sensing circuitry may constitute the connection sense signal made available to controller 110. The circuitry of FIG. 9 may be part of controller 110 or separate from (and connected to) controller 110.

Based on which type of connector is determined to be plugged in, controller 110 may control (e.g., by sending a switch control signal to) switch 403 to be in a first state or a second state. If controller 110 determines that a quarter-inch TRS connector is connected, then controller 110 may control switch 403 to switch to a first state that connects the ring node of combo jack 402 to codec input 4. If controller 110 determines that a 3.5 mm TRRS connector is connected, then controller 110 may control switch 403 to switch to a second state that connects the sleeve node of TRRS connector 113 to codec input 4. Alternatively, switch 403 may be controlled by controller 110 based on a user input via user interface 112.

In general, controller 110 may send any of the mix control signal, the relay control signal, and/or the switch control signal based on a user input received from user interface 112. controller 110 may additionally or alternatively send any of the mix control signal, the relay control signal, and/or the MUX control signal based on an algorithm executed by controller 110, either based on or independent from any user inputs received from user interface 112. As described previously with respect to FIG. 2, the algorithm may be implemented as hardwired circuitry, firmware, and/or by executing instructions stored in a computer-readable medium.

Figure 6A:
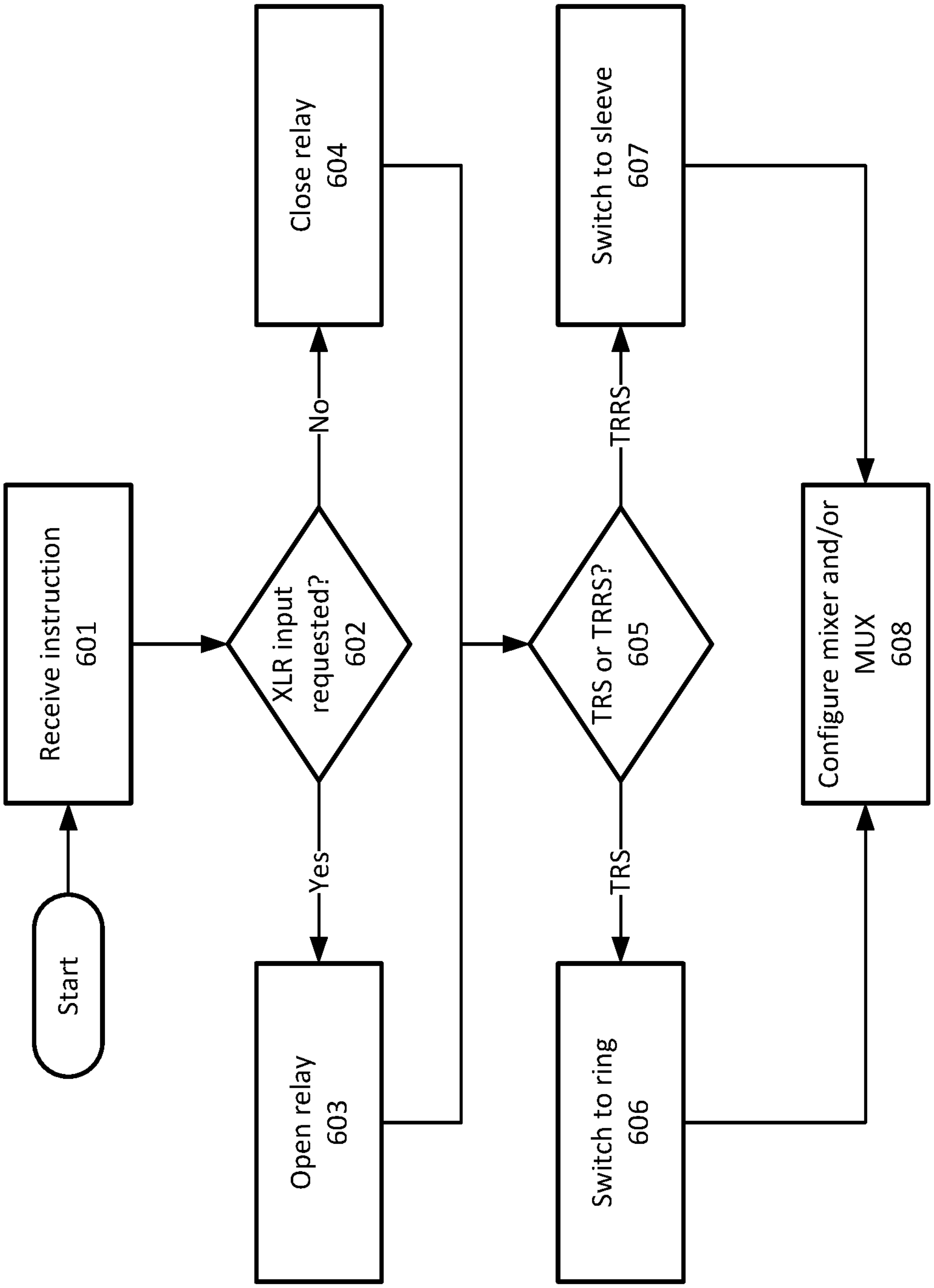
FIG. 6A is an example flowchart of a method that may be performed in accordance with aspects described herein.

FIG. 6A is an example flowchart of a method that may be performed while a microphone that comprises circuitry 100 or circuitry 400 is in operation. In the following description, it will be assumed by way of example that each step is performed by controller 110 as part of circuitry 100 or circuitry 400. However, any or all of the steps may be performed by any other portion of circuitry 100 or circuitry 400, such as by codec/DSP 180 or codec/DSP 480. While the method illustrated in FIG. 6A shows particular steps in a particular order, the method may be further subdivided into additional sub-steps, steps may be combined, and the steps may be performed in another order without necessarily deviating from the concepts described herein.

At step 601, controller 110 may receive an instruction. The instruction may be generated by, for example, the user interface 112 in response to a user input. Or, the instruction may be generated internally by controller 110. Or, the instruction may be received via USB connector 111 and generated by another device connected to the microphone via USB connector 111 (such as device 802 in FIG. 8). The instruction may identify or otherwise be associated with a particular configuration of the microphone. For example, the user may operate user interface 112 of the microphone, or operate a user interface of the USB-connected device, to select a particular microphone configuration. The microphone configuration may indicate or otherwise be associated with a particular state of relay 104, a particular mixing configuration of mixer 107, and/or a particular multiplexing configuration of multiplexer 108 (for circuitry 100), or with a particular state of relay 104 and/or a particular mixing and/or multiplexing configuration of mixer 407 (for circuitry 400). The configuration indicated by or otherwise associated with the instruction may, for example, be one of the configurations described herein with respect to any of FIGS. 3A-3F. However, any other configurations of any of the elements of circuitry 100 or circuitry 400 may be indicated or otherwise associated with the instruction.

The instruction may explicitly identify the configuration (s) of the various elements, such as by explicitly identifying a relay state, a mixer configuration (e.g., mix codec input 1 with codec input 2 at a 50/50 ratio), and/or a multiplexer configuration (e.g., connect one or more particular inputs of the multiplexer to one or more particular outputs of the multiplexer). Or, the instruction may identify a configuration using shorthand, such as with an index identifier. For example, a first configuration may be assigned a particular Configuration value (e.g., a first configuration may be assigned ConfigurationID=1, a second configuration may be assigned ConfigurationID=2, etc.). Each ConfigurationID value may be associated (e.g., in a look-up table by controller 110, stored in storage 202) with the details of the associated configuration. In such a case, controller 110 would use the ConfigurationID value and the look-up table to determine the configuration of each elements of circuitry 100 or circuitry 400, and then use that configuration to control the configuration of each of the elements. An example of the type of information stored in the look-up table may be as shown in Table 1 below. The "Relay 104" column may or may not be part of the table.

TABLE 1

Example Look-Up Table

| ConfigurationID | Relay 104 | mixer 407 (or mixer 107 and multiplexer 108) |
|---|---|---|
| 1 | open | left channel: mix of codec input 1 and codec input 2 at 40/60 ratio.<br>right channel: only codec channel 3, no mix. |
| 2 | open | left channel: codec input 1, no mix.<br>right channel: codec input 2, no mix. |
| 3 | open | . . . |
| . . . | closed | . . . |

In some cases, the instruction may or may not indicate whether an XLR input is requested and/or whether a TRS connector or a TRRS connector is used. In such cases where the instruction does not identify these, controller 110 may be able to separately ascertain these by sending whether voltages are present on the respective connector types to determine which connectors are plugged in.

At step 602, controller 110 may determine, based on the instruction and/or based on a separate sensing (e.g., of connector voltages) whether an XLR input is requested, in other words, whether XLR connection 103 is to be used as an input or an output. If XLR connection 103 is to be used as an input, then at step 603, controller 110 controls relay driver 102 to open relay 104 (if it is not already open) to produce an open circuit state between nodes 151 and 152, such as illustrated in FIG. 3A. If XLR connection 103 is not to be used as an input (e.g., is to be used as an output), then at step 604, controller 110 controls relay driver 102 to close relay 104 (if it is not already closed) to produce a closed circuit state between nodes 151 and 152, such as illustrated in FIG. 3B. Steps 601-604 are applicable to both examples of circuitry 100 and circuitry 400, and thus may be performed while using either circuitry.

At step 605, controller 110 may determine, based on the instruction and/or based on a separate sensing (e.g., of connector voltages), a particular type of connector(s) that is/are connected to the microphone. For example, controller 110 may determine whether a TRS connector or a TRRS connector is connected to headphone connection 113. If controller 110 determines that a TRS connector is connected, then at step 606, controller 110 may cause switch 403 to connect the ring node of combo jack 402 to codec input 4. If controller 110 determines that a TRS connector is connected, then at step 607, controller 110 may cause switch 403 to connect the sleeve node of headphone connection 113 to codec input 4. While steps 605-607 are shown as being performed after steps 602-604, steps 605-607 may be performed before steps 602-604 and/or in parallel with steps 602-604. Also, steps 605-607 may be skipped, such as where circuitry 100 is used and/or where no switch 403 or combo jack 402 is used.

At step 608, controller 100 may send signals to mixer 107 and/or multiplexer 108 (for circuitry 100) or to mixer 407 (for circuitry 400) that cause these elements to attain the desired respective configurations indicated by or otherwise associated with the instruction of step 601.

Figure 6B:
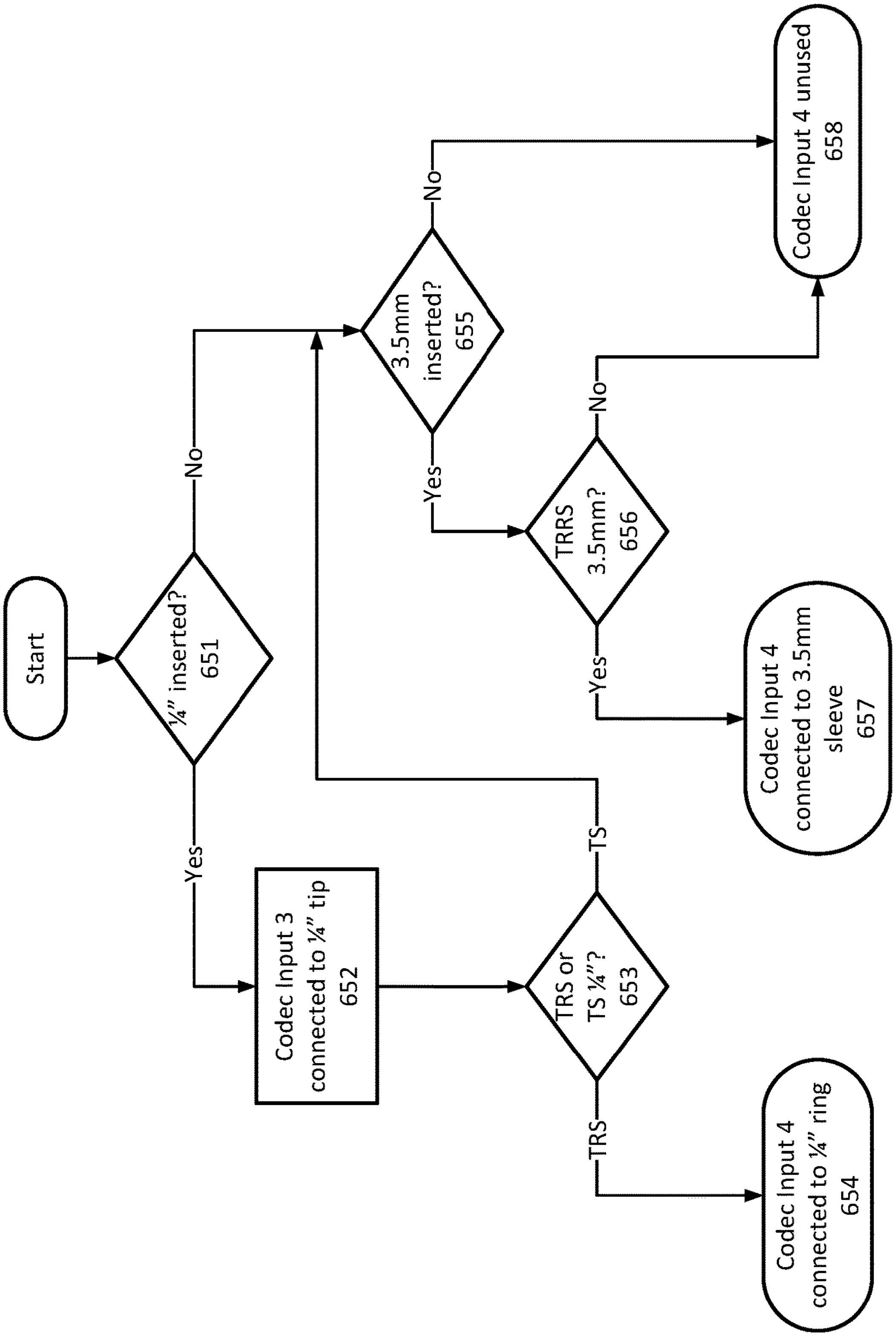
FIG. 6B is an example flowchart of another method that may be performed in accordance with aspects described herein.

FIG. 6B is an example flowchart of another method that may be performed while a microphone that comprises circuitry, such as circuitry 400, is in operation. In the following description, it will be assumed by way of example that each step is performed by controller 110 as part of circuitry 400. However, any or all of the steps may be performed by any other portion of circuitry 400, such as by codec/DSP 480. While the method illustrated in FIG. 6B shows particular steps in a particular order, the method may be further subdivided into additional sub-steps, steps may be combined, and the steps may be performed in another order without necessarily deviating from the concepts described herein. In certain steps, it is determined whether a particular connector has been inserted. This may be determined based on electrical currents and/or voltages sensed using conventional current sensor circuitry and/or voltage sensor circuitry (which may generate the above-mentioned connection sense signal) that may be part of controller 110 or in communication with controller 110.

At step 651, it may be determined whether a quarter-inch connector has been inserted. if so, then it may be determined at step 652 that codec input 3 404 is connected to a quarter-inch tip, and it may be further determined at step 653 whether the inserted quarter-inch connector is a TRS (stereo) or a TS (mono) connector. If it is determined that the inserted connector is a TRS connector, then it may be determined at step 654 that codec input 4 405 is connected to a quarter-inch ring of the inserted connector. On the other hand, if it is determined that the inserted connector is a TS connector, then it may be determined at step 655 whether a 3.5 mm connector is inserted. If it is determined that a 3.5 mm connector is inserted, then at step 656 it may be determined whether the inserted connector is a 3.5 mm TRRS connector. If it is determined that the inserted connector is a 3.5 mm TRRS connector, then it may be determined at step 657 that the codec input 4 405 is connected to a 3.5 mm sleeve. If it is determined that a 3.5 mm connector is not inserted, then it may be determined at step 658 that codec input 4 405 is unused. Controller 110 may store data (such as in storage 102) indicating the connection status of any of the codec inputs 1-4. Based on this stored data, controller 110 may cause any element of CODEC/DSP 480, such as mixer 407, to be configured in a particular manner. For example, if it is determined at step 658 that codec input 4 is unused, then controller 110 may configure mixer 407 to ignore (and not mix in) any signals received from codec input 4 via line 454. Or, for example, if it is determined at steps 652 and 654 that codec input 3 is connected to a quarter-inch TRS connector's tip and that codec input 4 is connected to the quarter-inch TRS connector's ring, then controller 110 may configured mixer 407 to treat the signal from codec input 3 as a left audio channel and the signal from codec input 4 as a right audio channel (or vice-versa). For example, mixer 407 may be configured not to mix (and to keep on separate audio channels) the audio from codec input 3 with the audio from codec input 4.

Figure 7:
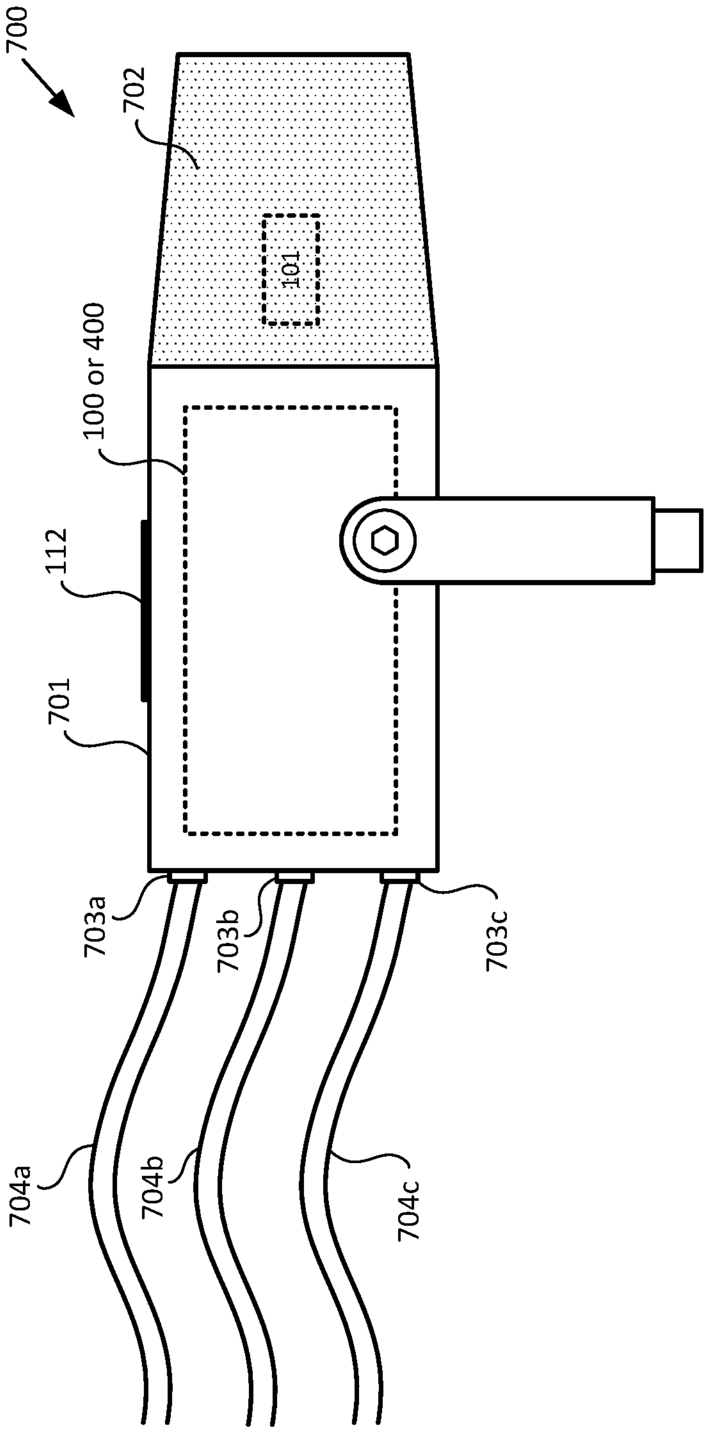
FIG. 7 is a side view of an example microphone containing microphone circuitry, such as the circuitry shown in FIG. 1, 4, or 10 in accordance with aspects described herein.

FIG. 7 is a side view of an example microphone 700 containing microphone circuitry such as circuitry 100 or circuitry 400 shown in FIG. 1 or 4. Microphone 700 may comprise a body 701, which may house one or more other components of microphone 700, such as circuitry 100 or circuitry 400. Microphone 700 may further include a windscreen 702 covering microphone cartridge 101. User interface 112 may be disposed on and/or in body 701 so as to be at least partially accessible by a user of microphone 700.

Body 701 may have one or more connectors, such as connectors 703*a*, 703*b*, and/or 703*c*, which may selectively connect, respectively, to one or more cables such as cables 704*a*, 704*b*, and/or 704*c* that themselves have compatible connectors. While three connectors are shown, there may be any number of connectors included. The connectors (generically referred to herein as one or more connectors 703) may be, for example, one or more universal serial bus (USB) connectors, one or more XLR connectors, one or more power connectors, one or more TRS connectors, one or more TRRS connectors, one or more combo jacks, and/or any other type of data and/or power connectors suitable for transporting signals such as power, digital data (including digital audio signals), and/or analog audio signals to and from the circuitry of microphone 700. For example, any of connectors 703 may be XLR connector 103, USB connector 111, combo jack 402, quarter-inch TRS connector 401, and/or headphones connector 113 (e.g., a 3.5 mm TRRS connector).

Figure 8:
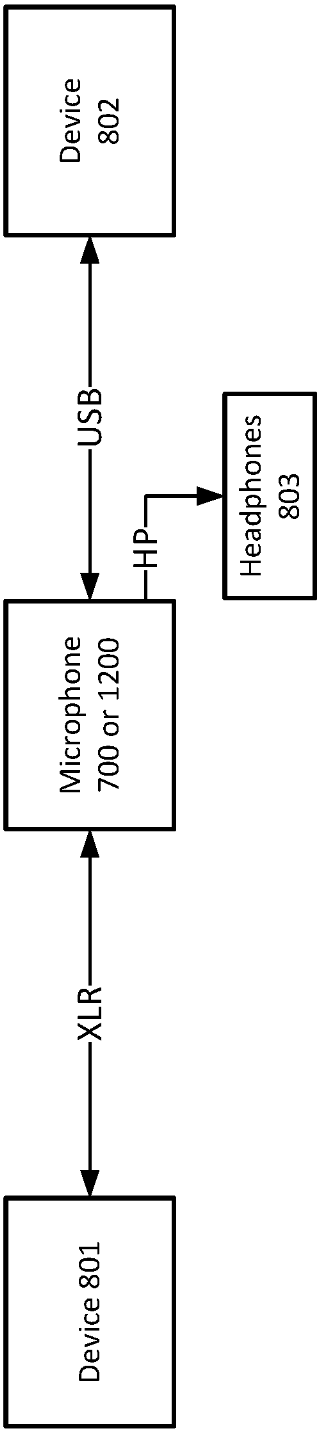
FIG. 8 is a block diagram of an example system that includes a microphone in accordance with aspects described herein.

FIG. 8 is a block diagram of an example system that includes microphone 700. In the shown example, microphone 700 or microphone 1200 (FIG. 12) may be connected to one or more other devices, such as device 801 and/or device 802. Device 801 may be connected with microphone 700 or 1200 via, for example, XLR connector 103. Device 802 may be connected with microphone 700 or 1200 via, for example, USB connector 111. Microphone 700 or 1200 may also be connected to headphones 803, such as via TRRS headphones connector 113 or TRS connector 401.

Devices 801 and 802 each may be any type of device capable of sending and/or receiving audio signals and/or data signals, such as another microphone, an audio source, a speaker, a mixer, an audio recording device, or a computer such as a smart phone or laptop computer, etc. In one example, device 801 may be another microphone that provides audio signals into XLR connector 103, and device 802 may be a smart phone that provides a user interface allowing a user to select a configuration of microphone 700 or 1200. The selected configuration may cause XLR connector 103 may be used as an input connector and cause audio signals provided by device (microphone) 801 to be mixed in a particular way with audio picked up by microphone cartridge 101 of microphone 700 or 1200. The resulting mixed audio signals may be output to headphone 803 and/or output to device (smart phone) 802 via USB connector 111. In other examples, device 801 may be an audio recording device or a speaker (or even another microphone similar or identical to microphone 700 or 1200), in which case the configuration selected via device (smart phone) 802 may cause XLR connector 103 to be used as an output connector and cause audio signals generated by microphone cartridge 101 to be output to device 801 (and also to be received by codec input 2 of microphone 700 or 1200).

Thus, the XLR connector (which may be passive) of microphone 700 or 1200 may be used as either an input connector or as an output connector to be daisy chained with the XLR connector of the other device such as another microphone. Accordingly, the user of the microphone may be able to conveniently use one or more of the connectors of microphone 700 or 1200 to expand the microphone 700 or 1200 to become part of a larger setup that uses a plurality of microphones. For example, audio signals from two or more separate, non-co-located microphones may be mixed and then output via a single USB connection. One of the microphone's signals may be generated by microphone cartridge 101 integral to microphone 700 or 1200, and another of the microphone's signals may be generated by an external microphone such as device 801.

Moreover, because a switchable XLR connector 103 may be used, such an XLR connector may function as an analog output in a standalone mode of microphone 700 or 1200, yet when placed into a mix mode, XLR connector 103 may function as a discrete analog input into the digital signal chain of circuitry 100 or circuitry 400, thereby producing two discrete output digital channels (e.g., left and right stereo channels) via USB connector 111 to another device such as device 802. This may be useful for, e.g., a mobile two-channel podcasting setup, as well as any other two (or other multi-) channel recording setups for personal use (e.g., in a vocalist/guitar arrangement or a vocal duet arrangement).

Figure 10:
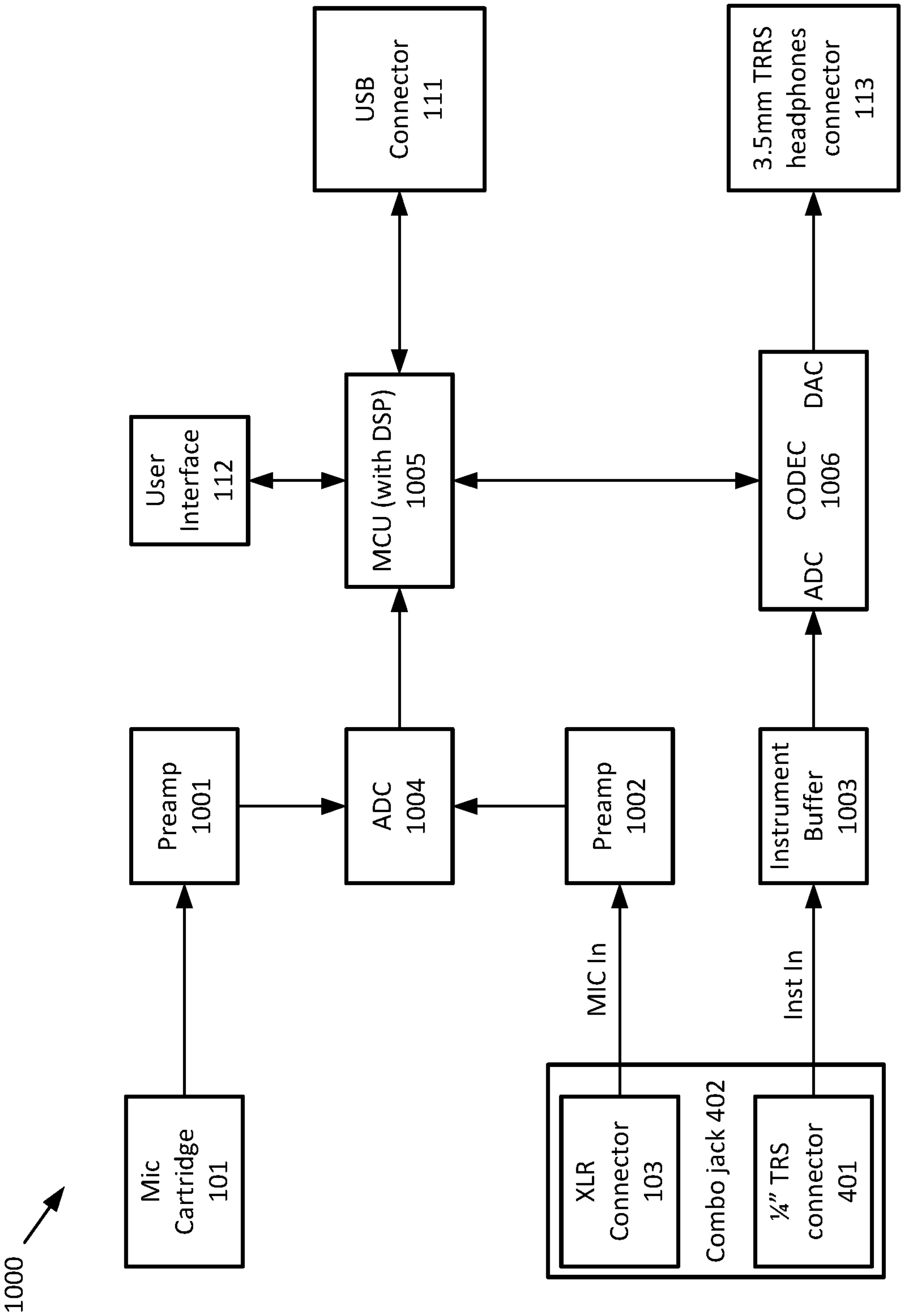
FIG. 10 shows a block diagram of example microphone circuitry in accordance with aspects described herein.

FIG. 10 shows a block diagram of another example microphone circuitry 1000. The microphone circuitry 1000 may be used in any microphone, such as in the microphones described herein with respect to FIG. 7 or FIG. 12. The microphone circuitry 1000 may include the microphone cartridge 101, the XLR connector 103 and the quarter-inch TRS connector 401 (which may be combined into the combo jack 402), the USB connector 111, and/or the 3.5 mm TRRS headphones connector 113, each of which have already been described herein. The microphone circuitry 1000 may further include one or more discrete preamplifiers, such as a preamplifier 1001 and a preamplifier 1002. The microphone circuitry 1000 may further include an instrument buffer 1003, an analog-to-digital converter (ADC) 1004, a microcontroller unit (MCU) 1005 or other type(s) of processor(s), and/or a coder-decoder (CODEC) 1006.

The MCU 1005 may further include a digital signal processor (DSP), or the DSP may be implemented separately from the MCU 1005. While an MCU is shown in FIG. 10, any one or more other type(s) of processor(s) may be used in place of the MCU 1005. The MCU 1005 may be responsible for controlling (e.g., coordinating) the operations of any of the other elements of the microphone circuitry 1000. For example, the MCU 1005 may control operation of the user interface 112, interpret user input to the user interface 112, and/or control output by the user interface 112. As another example, the MCU 1005 may control the operation of the ADC 1004 and/or of the CODEC 1006. As a further example, the MCU 1005 may implement USB communication protocols via the USB connector 111 to ensure that data is properly transmitted and/or received via the USB connector 111. While certain connections amongst the elements of the microphone circuitry 1000 are depicted with arrow in FIG. 10, these connections are only examples and may be physically and/or logically implemented differently. For example, any or all of the elements of the microphone circuitry 1000 may be interconnected via a shared data bus. Also, each of the arrows in FIG. 10 may represent audio signals (analog and/or digital) and/or data other than audio such as control data. Moreover, any audio transmission between elements of FIG. 10, as represented by the arrows, may be single-channel audio or multiple-channel (e.g., dual, for example left/right) audio.

The MCU 1005 may comprise storage (e.g., the same as the storage 202 described previously), which may comprise a non-transitory computer-readable medium, such as one or more memories, that stores instructions for performing the algorithm in order to perform any of the functions described herein attributed to the MCU 1005. The MCU 1005 may execute the stored instructions to perform these functions. In further examples, some or all of the functionality of the MCU 1005 may be additionally or alternatively implemented as hard-wired circuitry and/or as firmware.

The preamplifier 1001 and the preamplifier 1002 may have different configurations from each other and may be separate components from each other. For example, the preamplifier 1001 may be a first discrete preamplifier with an analog input connected to the microphone cartridge 101 and that has a first input impedance matched to the output impedance of the microphone cartridge 101, whereas the preamplifier 1002 may be a second discrete preamplifier with an analog input connected to the XLR connector 103 and that has a second input impedance that may be different from the first input impedance.

The instrument buffer 1003 may be implemented as a further preamplifier, such as a discrete preamplifier, connected to the quarter-inch TRS connector 401. The instrument buffer 1003 may have an analog input, connected to the quarter-inch TRS connector 401, that may have a third impedance appropriate for electric musical instruments such as electric guitars that may be plugged into the quarter-inch TRS connector 401. For example, the third impedance may be a higher impedance than the first impedance and/or the second impedance. When an external device (for example, a musical instrument, another microphone, a mixer, a wireless receiver, or some other analog audio source) is plugged into the combo jack 402, the appropriate preamplifier (preamplifier 1002 or instrument buffer 1003) is used to amplify the analog signal received from the external device. For example, where the external device (e.g., a microphone) having an output XLR connector (e.g., a male XLR connector) that is plugged into the XLR connector 103 (which may be, e.g., a female XLR connector) portion of the combo jack 402, the analog audio signal from the external device may be received via the "MIC In" line by the preamplifier 1002. On the other hand, where the external device (e.g., an electric guitar) has an output quarter-inch TRS connector (e.g., a male TRS connector) that is plugged into the quarter-inch TRS connector (which may be, e.g., a female TRS connector) portion of the combo jack 402, the analog audio signal from the external device may be received via the "Inst In" line by the instrument buffer 1003.

The ADC 1004 may be implemented as a single ADC or as multiple ADCs. For example, the preamplifier 1001 may feed into a first ADC of the ADC 1004 and the preamplifier 1002 may feed into a second ADC of the ADC 1004. The ADC(s) of ADC 1004 may be high-quality ADCs capable of outputting, for example, audio data at one or more speeds up to 96 kbits/second (or even faster, if desired). A further ADC may be implemented by the CODEC 1006 to convert analog audio output by the instrument buffer 1003, or such an ADC may be implemented separately from the CODEC 1006, between the output of the instrument buffer 1003 and an input of the CODEC 1006.

The MCU 1005 may receive digital audio signals from the ADC 1004 (which may be digitized audio based on analog audio from the ADC 1004) as well as digital audio signals from the CODEC 1006 (which may be digitized audio based on analog audio from the instrument buffer 1003). The MCU 1005 may perform routing, digital signal processing, and/or mixing of any received digital audio signals. For example, the MCU 1005 may receive digital audio signals from the ADC 1004, and forward those digital audio signals to the USB connector 111 and/or to the CODEC 1006. As another example, the MCU 1005 may receive digital audio signals from the CODEC 1006, and forward those digital audio signals to the USB connector 111. The MCU 1005 may further perform digital signal processing on any of the digital audio signals it receives. For example, the MCU 1005 may comprise DSP circuitry for processing audio, for example one or more equalizers such as a high pass/presence boost equalizer and/or a mode equalizer, a de-esser, a bass equalizer such as a bass tamer (which may be used to reduce the proximity effect), a limiter, a compressor, an automatic level control (ALC), and/or any other digital signal processing techniques.

The MCU 1005 may further mix any of the digital audio signals that it receives, and output a mixed version of those digital audio signals. For example, if the digital audio received by the MCU 1005 contains two channels (e.g., left and right channels), the MCU 1005 may partially or fully mix those two channels before outputting the mixed audio to the USB connector 111 and/or to the CODEC 1006. For example, the MCU 1005 may output 96 k two-channel audio to the USB connector 111.

The CODEC 1006 may perform encoding, decoding, routing, and/or mixing of digital audio signals received from the ADC input connected to the instrument buffer 1003 and from the MCU 1005. For example, the CODEC 1006 may receive analog audio signals from the instrument buffer 1003, convert those analog audio signals into digital audio signals, and forward those digital audio signals to the MCU 1005. As another example, the CODEC 1006 may receive digital audio signals from the MCU 1005, convert those digital audio signals using its digital-to-analog converter (DAC), and send the converted analog audio signals to the 3.5 mm TRRS headphones connector 113. The CODEC 1006 may further convert any digital audio signals to other digital audio signals, such as by modifying how the digital audio signals are encoded. For example, the CODEC 1006 may up-convert or down-convert the bit rate of any digital audio signal it receives, or otherwise change the encoding format of any digital audio signal it receives.

In operation, an analog audio signal generated by the microphone cartridge 100 (generated in response to sound detected by the microphone cartridge 100) may be amplified by the preamplifier 1001 and converted to a digital audio signal by the ADC 1004, which may be sent to the MCU 1005. Simultaneously with or at a different time from receiving the audio from the microphone cartridge 101, analog audio may be received at the MIC In line from the XLR connector 103 and/or at the Inst In line from the quarter-inch TRS connector 401. The MIC In audio may be amplified by the preamplifier 1002, digitized by the ADC 1004, and sent to the MCU 1005. The Inst In audio may be amplified by the instrument buffer 1003, digitized by the CODEC (or another ADC), and sent to the MCU 1005. Any of these analog and digital audio signals may be single-channel or multi-channel (e.g., dual channel, such as left and right channels) audio signals. The MCU 1005 may receive any or all of the digital audio signals, process them such as by applying one or more digital signal processing functions on them, and forward the processed digital audio signals to the USB connector 111 and/or to the CODEC 1006 as desired. The USB connector 111 may forward any of the received digital audio signals to a device (e.g., the device 802, FIG. 8), and the CODEC 1006 may convert any of the received digital audio signals to analog audio signals (using its DAC) and forward those analog audio signals to the 3.5 mm TRRS headphones connector for, e.g., monitoring purposes. Where the circuitry 1000 receives multiple audio sources (e.g., from two or more of the mic cartridge 101, the XLR connector 103, or the quarter-inch TRS connector 401), the circuitry 1000 may maintain each of these sources as separate audio channels. For example, audio received and digitized from the mic cartridge 101 may be a first digital audio channel, and audio digitized based on analog audio from the XLR connector 103 or from the quarter-inch TRS connector 401 may be a second digital audio channel separate from the first digital audio channel. This separation of channels may be maintained in both the analog and digital domains of the circuitry 1000. Thus, for example, if audio is received at the same time from both the mic cartridge 101 and from the XLR connector 103, each of those audio sources may be separately amplified and digitized by their respective ADCs and preamplifiers as separate audio channels, separately processed and routed by the MCU as separate digital audio channels, and maintained as separate digital audio channels when sent via the USB connector 111. The same may occur when audio from both the mic cartridge 101 and the quarter-inch TRS connector is received by the circuitry 1000 at the same time. Moreover, the ADC 1004, the CODEC's 1006 ADC, and/or the MCU may label each channel of the digitized data by its source, such as with a channel identifier unique to each channel. For example, each source's digital audio may include data (e.g., a multi-bit field of a header of a data packet or frame that contains audio data for the channel, or as a packet or frame separate from the audio data) associated with and indicating the audio source. Thus, the device 802 that receives the various audio via the USB connector 111 would be able to distinguish, based on the channel identifiers, between the various audio sources and treat each audio source differently as desired. An example of this is discussed below with respect to FIGS. 11A and 11B.

The preamplifier 1002 (connected to the "MIC In" line) may provide power to a device (such as another microphone) connected to the XLR connector 103. For example, the preamplifier 1002 may provide direct-current (DC) voltage one two or more pins of the XLR connector 103, such as pins 2 and 3. The DC voltage may be any desired voltage, such as 12 volts, or a larger or smaller voltage. Conveniently, the XLR-connected microphone or other device may use the power for its own operation (e.g., to power its own active electronics), without the need for the external device to have a battery or other separate power source. Provision of power through the same XLR cable as the audio signal is known as phantom power.

Any portion of circuitry 1000 may be implemented, for example, as one or more programmable gate arrays (PGAs), one or more application-specific integrated circuits (ASICs), one or more commercial off-the-shelf integrated circuits, and/or any other types of circuitry. For example, the MCU 1005 and/or the CODEC 1006 may be implemented as one or more PGA chips, one or more ASICs, one or more processors, a non-transitory computer-readable medium such as one or more memories storing instructions for execution by the one or more processors to perform the functions attributed to the MCU 1005 and/or the CODEC 1006, etc.

The circuitry 1000 may also include reverse (e.g., back-channel) audio monitoring functionality, whereby the 3.5 mm headphones connector 113 may allow a user to listen to audio received via the USB connector 111 (e.g., from the device 802). For example, the MCU 1005 may receive digital audio via the USB connector 111, perform digital signal processing on the received digital audio, and forward the processed digital audio to the CODEC 1006, which may convert the digital audio to an analog audio signal that is sent to the 3.5 mm TRRS headphones connector 113.

Figure 11A:
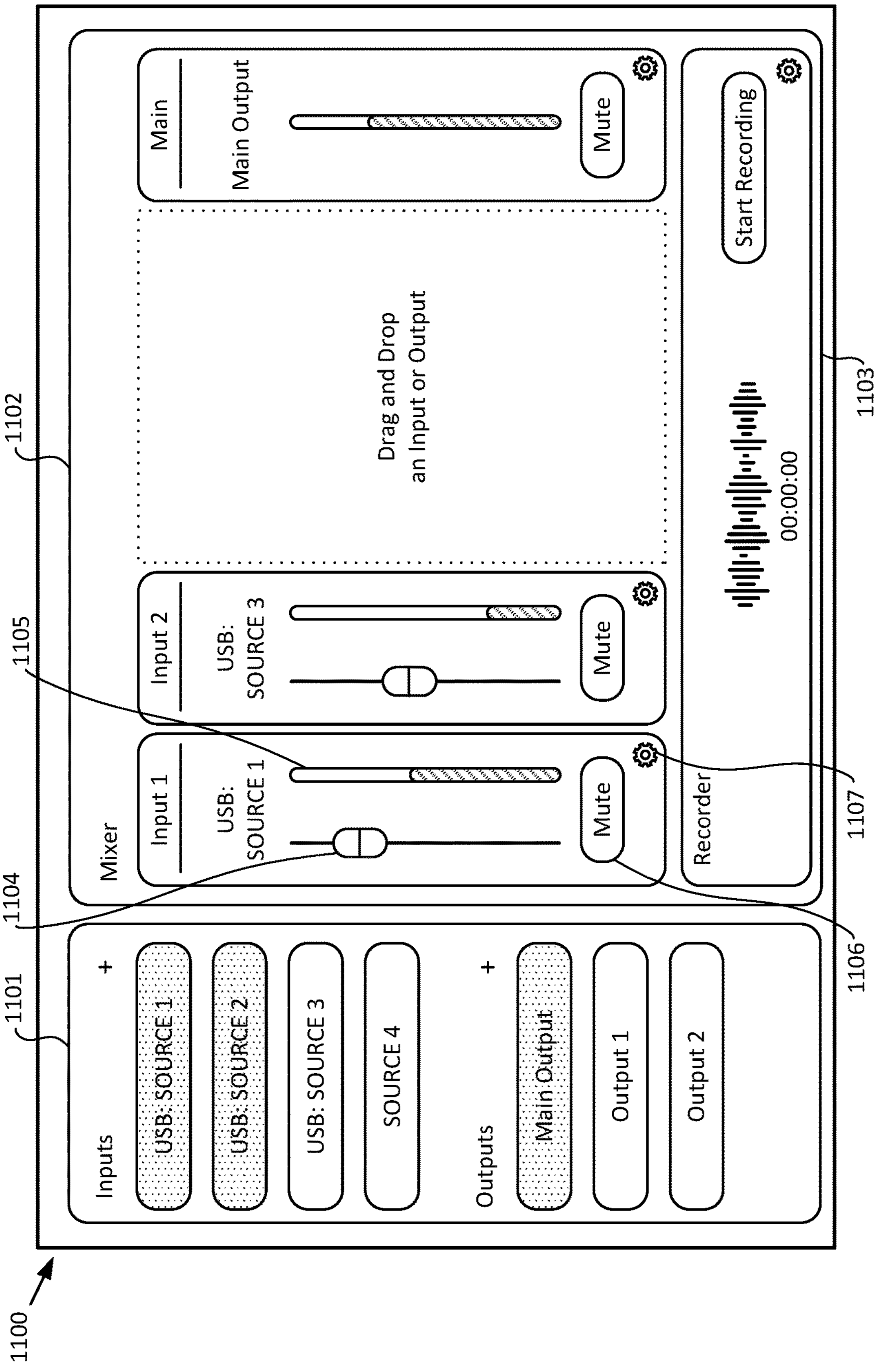
FIGS. 11A and 11B show an example user interface that may be presented by a device, such as the device 802, that may be connected to a microphone, such as the microphone 700 or 1200, in accordance with aspects described herein.

FIG. 11A shows an example user interface 1100 that may be presented by a device, such as the device 802, that may be connected to a microphone, such as the microphone 700 or 1200, in accordance with aspects described herein. In the illustrated example, the device 802 may include or be connected to a display device (such as a computer screen, tablet display, phone display, etc.) that may cause the user interface 1100 to be displayed. The device 802 may have one or more processors, as well as memory storing instructions that, when executed by the one or more processors, cause the device 802 to communicate with the microphone 700 or 1200 via the USB connection, to present the user interface 1100 to a user of the device 802, and to perform audio processing (e.g., mixing) and/or other functionality as described herein.

The user interface 1100 includes an inputs/outputs portion 1101, a mixer portion 1102, and a recorder portion 1103. The inputs/outputs portion 1101 may include one or more selectable representations (e.g., buttons, icons, windows, etc.) each representing a different audio source. In the illustrated example, the audio sources include SOURCE 1, SOURCE 2, SOURCE 3, and SOURCE 4, wherein the first three listed audio sources are indicated as being received via a USB connection. For example, SOURCE 1 may be audio received via the USB connector 111 that was based on audio generated by the microphone cartridge 101, SOURCE 2 may be audio received via the USB connector 111 that was based on audio received by the XLR connector 103, and SOURCE 3 may be audio received via the USB connector 111 that was based on audio received by the quarter-inch TRS connector 401 of the microphone circuitry 1000. The device 802, and specifically the user interface 1100, may be able to distinguish between the various audio sources received via the same USB connector 111, since the audio data from the various audio sources may be individually labeled with data identifying the source of the audio, as discussed above. The inputs/outputs portion 1101 may also include one or more selectable representations each representing a different output, shown by way of example as Main Output, Output 1, and Output 2. The user may be able to define the names of the various inputs and outputs.

The mixer portion 1102 of the user interface 1100 may include representations of one or more of the inputs and/or outputs that the user selected from the inputs/outputs portion 1101. Each representation of a selected input or a selected output may be in a window or other portion that includes the name of the input or output, a live meter showing the current audio signal strength for that input or output, and a user-selectable mute button. For example, the representation of Input 1 includes a live meter 1105 and a mute button 1106. Each of the represented inputs may also include a user-selectable gain control for that input, such as gain control 1104 for Input 1. Each of the represented inputs and outputs may further include a user-selectable settings button, such as settings icon 1107, selection of which may cause the user interface 1100 to display further information and/or selectable options for the input or output. Additional mixing functions may be provided so that the user can mix the various inputs. Based on the user's settings (for example, the gain control settings of the various selected inputs), the resulting combination of those inputs may be provided to the Main Output, as shown on the right-hand side of FIG. 11A. The recorder portion 1103 of the user interface 1100 may include user-selectable functionality that allows the user to record audio, such as audio present at the Main Output.

Figure 11B:
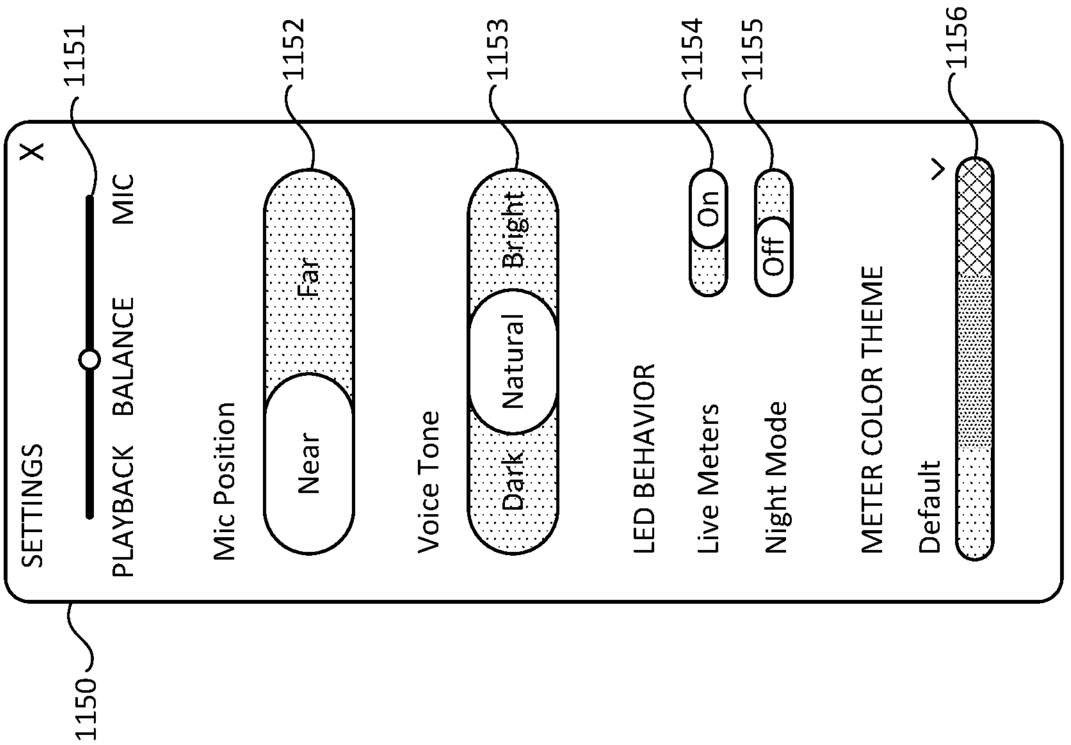

FIG. 11B shows settings information 1150 that may be presented as part of the user interface 1100, such as in response to the user selecting the settings icon 1107 of FIG. 11A. The settings information 1150 may be in the form of, for example, a pop-up window overlaying or next to the information of FIG. 11A, or displayed as a separate screen. The settings information 1150 may include one or more user-selectable elements, such as a control 1151 that allows the user to select between playback, balance, and mic modes, a microphone position control 1152 that allows the user to select between near and far DSP settings, an a voice tone control 1153 that allows the user to select between dark, natural, and bright DSP settings. Any settings that the user sets via the user interface 1100 may be sent to the controlle 110 or the MCU 1005 to cause an update to microphone functionality, including for example, DSP parameters. For example, a "near" mode may be associated with a first set of DSP parameter settings and a "far" mode may be associated with a different second set of DSP parameter settings. Also, the dark, natural, and bright voice tones may each be associated with different settings of DSP parameters. Examples of such DSP parameters for which settings may be provided may include high pass/presence boost equalization, mode equalization, de-essing, bass equalizing, bass taming, limiting , compression, and/or ALC. An indication of the microphone position mode and/or the voice tone setting may be sent by the device 802 to the microphone 700 or 1200 via the USB connection. Alternatively, an indication of one or more DSP parameter settings associated with the microphone position mode and/or the voice tone setting may be sent by the device 802 to the microphone 700 or 1200 via the USB connection. The controller 110 or the MCU 1005 may receive this indication and adjust the settings of the DSP based on the indication. The DSP may then use these adjusted settings when processing audio. In this way, the user may control one or more settings of the microphone 700 or 1200.

Additional settings of the microphone 700 or 1200 that the user may control using the settings information 1150 is the live meter behavior of the microphone 700 or 1200. For example, the user interface 112 of the microphone (see, e.g., FIG. 7 or FIG. 12) may include one or more lights (e.g., light-emitting diodes (LEDs)) that can be used to display information about the microphone and/or about the audio being handled by the microphone. For example, the user interface 112 may display a live meter of the energy or power of audio being handled by the microphone. The live audio intensity may be averaged over a sliding window of time to provide a smoother (e.g., less spiky) visual indication. The user interface 112 may include a plurality of LEDs, such as in a sequential (e.g., linear) arrangement, and the LEDs may be configurable to emit multiple colors. The settings information 1150 may include a user-selectable control 1154 for turning on/off the live metering function of the user interface 112 of the microphone. The settings information 1150 may include a user-selectable control 1155 for turning on/off a night mode of the user interface, in which during the night mode the LEDs may emit different colors or at different intensities appropriate for a dark environment (e.g., a dimmed output or a more reddened color scheme). The settings information 1150 may include a user-selectable control 1156 (e.g., a drop-down menu) for selecting a live meter color theme from amongst a plurality of color themes. The plurality of color themes may be predetermined, and/or they may be customized by the user, such as via a color-picker interface. Examples of color themes for the live meter function include (for low/medium/high audio intensity): green/yellow/red, purple/blue/green, light green/yellow/pink, and/or any other combination of multiple colors that the LEDs are able to display. For example, the color theme may include a first color, a second color different from the first color, and a third color different from the first color and from the second color. While three-colors themes are discussed by way of example, the themes may have any number of different colors, such as two different colors, three different colors, four different colors, or more. The different colors may be associated with (and displayed at) different regions of the user interface 112. For example, where the user interface is a left-right linear arrangement of LEDs 1302 (such as illustrated in FIGS. 13A-13C), one or more of the LEDs (e.g., LEDs 1302*a*, 1302*b*, 1302*c*, 1302*d*, and 1302*e*) on the left side may display green, one or more LEDs (e.g., LEDs 1302*f*, 1302*g*, 1302*h*, 1302*i*, 1032*j*, 1302*k*, and 1302*m*) at the middle of the arrangement may display yellow, and one or more LEDs (e.g., LEDs 1302*n*, 1302*p*, 1302*q*, and 1302*r*) at the right side of the arrangement may be display red. The different colors may be distinct or they may run smoothly into each other from one side to the other of the user interface 112 without clear distinctions between the colors, such as a rainbow does. Each meter color theme may also be associated with a particular live meter mode (for example, Mode A or Mode B as discussed below with respect to FIGS. 14A and 14B). An indication of the selected meter color theme (or an indication of the colors to be used in the theme), which may also include a selection of Mode A or Mode B live meter mode, may be sent by the device 802 to the microphone 700 or 1200 via the USB connector 111. The controller 110 or the MCU 1005 may receive this indication and cause the user interface 112 to display the indicated colors/theme.

Figure 12:
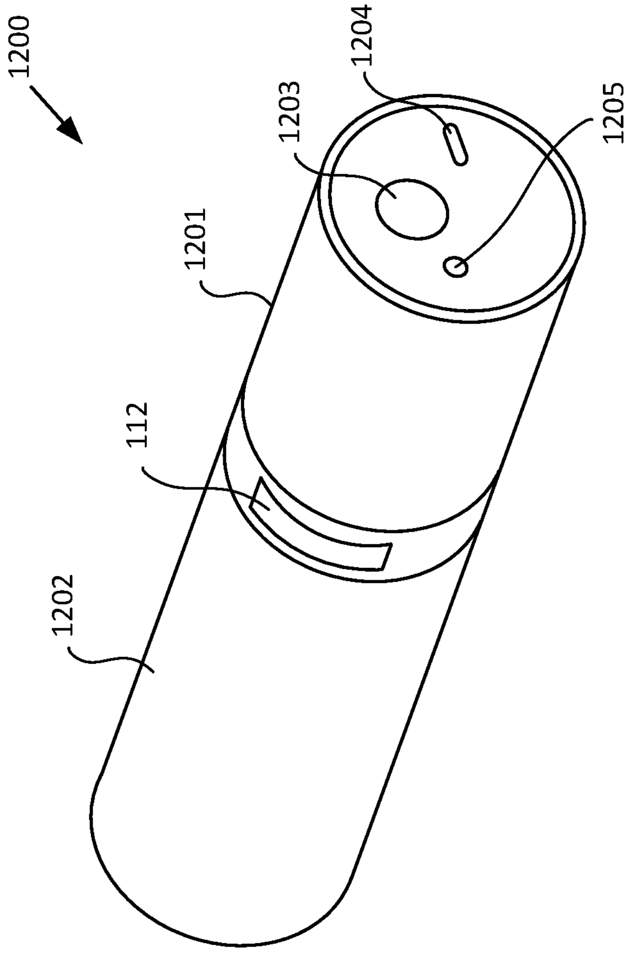
FIG. 12 is a perspective view of an example microphone containing microphone circuitry, such as the circuitry shown in FIG. 1, 4, or 10 in accordance with aspects described herein.
Figures 13A, 13B, 13C:
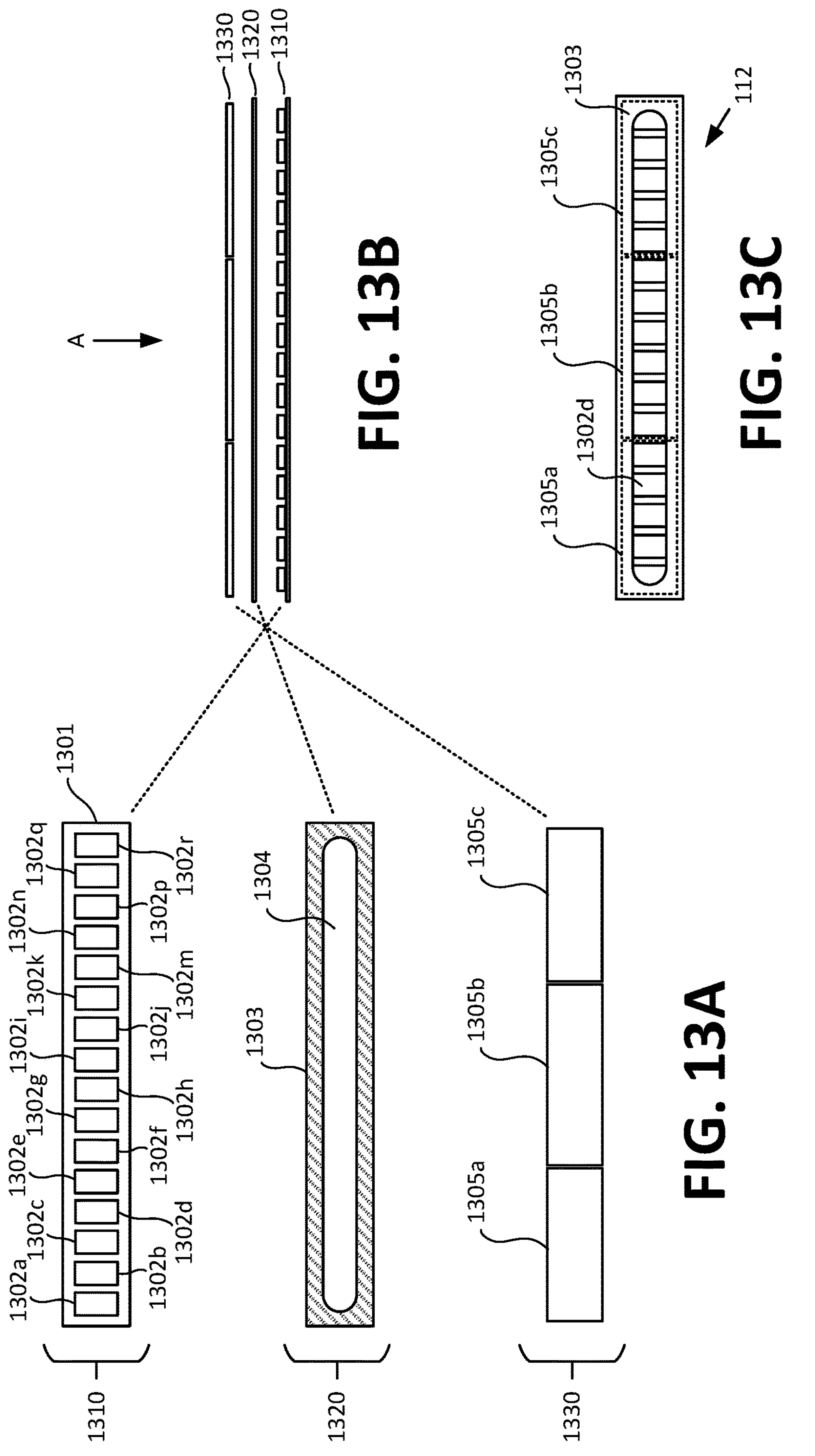
FIG. 13A is an exploded top-down view of various layers of an example user interface that may be part of any of the microphones described herein, such as part of the microphones illustrated in FIG. 7 or 12, in accordance with aspects described herein.
FIG. 13B is an exploded side view of the layers of FIG. 13A in accordance with aspects described herein.
FIG. 13C is a top-down view of the layers of FIGS. 13A and 13B as assembled into the example user interface in accordance with aspects described herein.

FIG. 12 is a perspective view of an example microphone 1200 containing microphone circuitry, such as the circuitry 100, 400, or 1000 shown in FIG. 1, 4, or 10. The microphone 1200 may include a body 1201, such as a housing. The body 1201 may be connected to a windscreen 1202 at one end, and may include one or more connectors such as connectors 1203, 1204, and 1205 at the other end. The connector 1203 may be, for example, the XLR connector 103, the quarter-inch TRS connector 401, or the combo jack 402 that includes both the XLR connector 103 and the quarter-inch TRS connector 401. The connector 1204 may be, for example, the USB connector 111. The connector 1205 may be, for example, the 3.5 mm TRRS headphones connector 113. The body 1201 may further include the user interface 112.

FIG. 13A is an exploded top-down view of various layers of an example user interface (such as the user interface 112) that may be part of any of the microphones described herein, such as part of the microphones illustrated in FIG. 7 or 12. The user interface 112 may be made from a plurality of stacked layers. For example, the user interface 112 may include a first layer 1310 that includes a plurality of LEDs 1302*a*, 1302*b*, 1302*c*, 1302*d*, 1302*e*, 1302*f*, 1302*g*, 1302*h*, 1302*i*, 1302*j*, 1302*k*, 1302*m*, 1302*n*, 1302*p*, 1302*q*, and 1302*r* (collectively referring to as LEDs 1302) or other lights mounted to a substrate 1301. The user interface 112 may include a second layer 1320 that includes a mask 1303 (which blocks light from the LEDs 1302) having a light-passing portion 1304 (which allows at least some of the light from the LEDs 1302 to pass through, and which may include a light diffusion material that diffuses the light). The user interface 112 may include a third layer 1330 that includes one or more touch-sensitive portions (e.g., capacitive touch-sensitive surfaces) such as touch-sensitive portions 1305*a*, 1305*b*, and 1305*c*. The touch-sensitive portions 1305 may be partially or fully transparent to the light emitted by the LEDs 1302. Where the light-passing portion 1304 is not diffuse, the touch-sensitive portions 1305 may be light-diffusing.

While sixteen LEDs 1302 are shown, any number of LEDs 1302 may be used. Also, while the LEDs 1302 are shown linearly arranged, they may be arranged in any manner desired, such as in a two-dimensional matrix or in a curved pattern. Each of the LEDs 1302 may be a multi-color LED, in that each of the LEDs 1302 may be capable of displaying multiple different colors as desired. For example, each of the LEDs 1302 may be configurable to dynamically emit and change between various colors such as (but not limited to) green, red, yellow, orange, blue, purple, pink, etc. For example, each LED 1302 may be made up of three smaller dedicated-color LEDs such as a red smaller LED, a green smaller LED, and a blue smaller LED, where the color emitted by the larger LED 1302 would result from a mixture of the light intensities of the three smaller LED color outputs.

FIG. 13B is an exploded side view of the layers of FIG. 13A. In the illustrated example, layer 1330 may be placed upon layer 1302, which may be placed upon layer 1310. While a space is shown between each of the three layers, this is for easier visualization and the layers may or may not be touching one another. For example, the layer 1330 may be resting upon and in physical contact with the layer 1320, and the layer 1302 may be resting upon and in physical contact with the layer 1310. While the layers 1310, 1320, and 1330 are shown as flat layers, they may be curved at least partially wrap around the body 701 of the microphone 700 or the body 1201 of the microphone 1200. The layers 1310, 1320, and 1330 may be flexible so as to be wrappable around the body 701 or around the body 1201, or the layers 1310, 1320, and 1330 may be inflexible and pre-curved or otherwise pre-shaped to conform with the curvature or other outer shape of the body 701 or the body 1201.

Each of the LEDs 1302 and touch-sensitive portions 1305 may be controllable by the controller 110 or the MCU 1005. For example, the controller 110 or the MCU 1005 may control the color and timing of each of the LEDs 1302, and the controller 110 or the MCU 1005 may receive an indication from any of the touch-sensitive portions 1305 that the touch-sensitive portion 1305 is being touched, for how long, over what area or region, and/or at what pressure.

FIG. 13C is a top-down view of the layers of FIGS. 13A and 13B as assembled into the example user interface 112. The view in FIG. 13C is from the point of view "A" as indicated by the arrow in FIG. 13B. As can be seen, each of the LEDs 1302 may be positioned to at least partially shine light through the light-passing portion 1304 and through one of the touch-sensitive portions 1305. By including the one or more touch-sensitive portions 1305 layer over the LEDs 1302, and by responding to user touch such as by changing which of, and how, the LEDs 1302 emit light, this can give the user the experience of interacting with the LEDs 1302. For example, if the user touches and releases (or touches and holds) any of the touch-sensitive portions 1305, the controller 110 or the MCU 1005 may detect this based on signals from the touch-sensitive portions 1305, and in response to these signals may modify which LEDs 1302 light up, which colors they emit, and at what brightness they emit. For ease of reading and to avoid clutter, only LED 1302*d* is explicitly labeled by way of example in FIG. 13C. However, it will be understood that all of the LEDs 1302 in FIG. 13C are the same LEDs 1302 as illustrated in FIGS. 13A and 13B.

As an example, in response to the user touching and releasing (e.g., tapping) any of the touch-sensitive portions 1305, the controller 110 or the MCU 1005 may put the microphone into a mute mode, in which any detected and/or received audio may be muted and not sent via the USB connector 111. The controller 110 or the MCU 1005 may also cause one or more, or even all, of the LEDs 1302 to produce a lighting pattern that indicates mute mode, such as by flashing, or to staying constantly lit, or emitting some other pattern (e.g., lighting every other LED 1302). As another example, in response to the user touching and sliding from one of the touch-sensitive portions 1305 to another of the touch-sensitive portions 1305, the controller 110 or the MCU 1005 may interpret this as a gain (e.g., volume) adjustment command. Depending upon whether the gain adjustment is to increase or decrease gain, the LEDs 1302 may emit different patterns. For example, if the user slides from touch-sensitive portion 1305*a* to touch-sensitive portion 1305*b*, or from touch-sensitive portion 1305*a* to touch-sensitive portion 1305*b* and then to touch-sensitive portion 1305*c*, or from touch-sensitive portion 1305*b* to touch-sensitive portion 1305*c*, then this may be interpreted as a gain-up adjustment, and the LEDs 1302 may change from lighting up a first subset of the LEDs (e.g., 1302*a*, 1302*b*, 1302*c*, and 1302*d*) to a larger second subset of the LEDs (e.g., 1302*a*, 1302*b*, 1302*c*, 1302*d*, 1302*e*, 1302*f*, 1302*g*, and 1302*h*) depending upon how far the user slides. Likewise, if the user slides from touch-sensitive portion 1305*c* to touch-sensitive portion 1305*b*, or from touch-sensitive portion 1305*c* to touch-sensitive portion 1305*b* and then to touch-sensitive portion 1305*a*, or from touch-sensitive portion 1305*b* to touch-sensitive portion 1305*a*, then this may be interpreted as a gain-down adjustment, and the LEDs 1302 may change from lighting up a first subset of the LEDs (e.g., 1302*a*, 1302*b*, 1302*c*, 1302*d*, 1302*e*, 1302*f*, 1302*g*, and 1302*h*) to a smaller second subset of the LEDs (e.g., 1302*a*, 1302*b*, 1302*c*, and 1302*d*) depending upon how far the user slides. Other touch gestures may be used for mute or gain adjustment, as desired.

As another example, in response to the user touching and sliding from one of the touch-sensitive portions 1305 to another of the touch-sensitive portions 1305, the controller 110 or the MCU 1005 may interpret this as a balance adjustment command. For example, if the user slides left, then this may adjust balance toward the left audio channel, and if the user slides right, then this may adjust balance toward the right audio channel. The balance may be indicated by which one more LEDs 1302 are lit up, where centered balance may be indicated by just the middle (or middle two) LEDs 1302 of the user interface 112 being lit up, and an adjustment left or right corresponding to lighting up one or more LEDs 1302 to the left or right of the center of the user interface 112.

In general, the LEDs 1302 may indicate a variety of aspects associated with the microphone, such as microphone state (e.g., muted or not muted) and microphone adjustment (e.g., gain adjustment), and these indications may be responsive to user touch input to one or more of the touch-sensitive portions 1305. Moreover, the LEDs 1302 may provide a live meter function for the audio being detected and/or received by the microphone, and/or for the audio being sent by the microphone to an external device such as via the USB connector 111. As described below, the LEDs 1302 may operate in a plurality of different live meter modes.

Figure 14B:
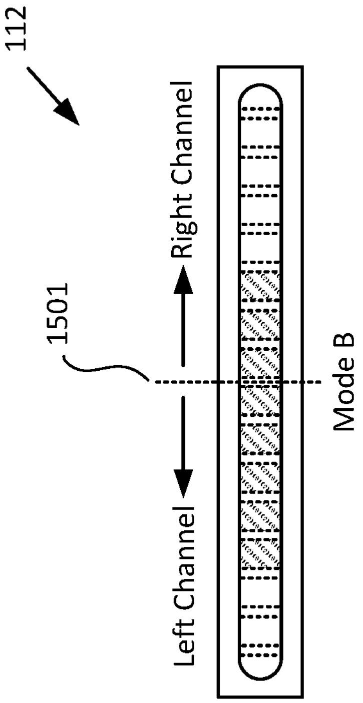
FIG. 14B illustrates example operation of the user interface of FIG. 13C in a second live meter mode, referred to herein as "Mode B," in accordance with aspects described herein.
Figure 14A:
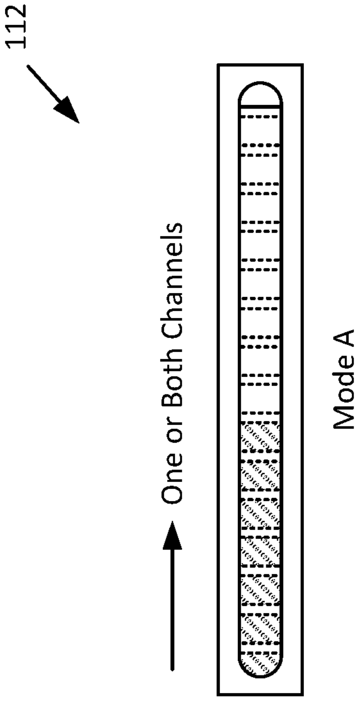
FIG. 14A illustrates example operation of the user interface of FIG. 13C in a first live meter mode, referred to herein as "Mode A," in accordance with aspects described herein.

FIG. 14A illustrates example operation of the user interface of FIG. 13C in a first live meter mode, referred to herein as "Mode A." In Mode A, the LEDs 1302 may be used to dynamically illustrate the audio level of audio being received and/or detected by the microphone, or of audio being sent externally by the microphone such as via the USB connector 111. The audio level may start from one end of the linear arrangement of LEDs 1302 (such as from the left side of the user interface 112) as the lowest audio level, and progress as a lit-up bar of LEDs 1302 toward the other end (e.g., the right side of the user interface 112) that becomes longer as the audio level increases. For example, FIG. 14A shows the seven left-most LEDs 1302 lit up (illustrated via cross-hatching) for the current audio level. If the audio level increases, then additional LEDs 1302 (e.g., the left-most eight, nine, or more LEDs 1302) may light up. If the audio level decreases, then fewer LEDs 1302 (e.g., the left-most six, five, or fewer LEDs 1302) may light up. The audio level may be "live," in that the indicated level is associated with the current instant level of the audio or with a filtered version of the current audio level. For example, the live meter at any given time may indicate the average of the audio levels over the last N samples (where N may be any number of samples). This type of filtering is sometimes referred to as a moving-window low-pass filter, where the length of the window is N. In Mode A, the indicated audio level may be for a single channel (e.g., for just the left audio channel or just the right audio channel) or for a combination of a plurality of channels (e.g., an average or other combination of the levels of the left audio channel and the right audio channel).

FIG. 14B illustrates example operation of the user interface of FIG. 13C in a second live meter mode, referred to herein as "Mode B." In Mode B, the LEDs 1302 may be used to dynamically and simultaneously illustrate the audio levels of two audio channels being received and/or detected by the microphone, or of two audio channels being sent externally by the microphone such as via the USB connector 111. In Mode B, the user interface 112 may be thought of as being functionally divided into two portions (e.g., regions), such as a left region and right region. The division between the two regions is illustrated as dividing line 1501 in FIG. 14B. Dividing line 1501 is not necessarily a physical or real element of the user interface, and is shown merely to help explain how Mode B operates. In the shown example, one of the regions may indicate the audio level of a first audio channel (such as the left audio channel) and the other of the regions may indicate the audio level of a second audio channel (such as the right audio channel). The audio levels for the two channels may start from the dividing line 1501 as the lowest audio level, and progress as lit-up bars of LEDs 1302 in opposite directions toward their respective ends of the user interface 112 that becomes longer as the audio levels increase. For example, FIG. 14B shows the audio level of the left channel with five LEDs 1302 lit up (illustrated via cross-hatching) and the audio level of the right channel with three LEDs 1302 lit up. For each channel, if the audio level increases, then additional LEDs 1302 may light up in the corresponding region. If the audio level decreases, then fewer LEDs 1302 may light up in the corresponding region. As in Mode A, the audio levels for Mode B may be "live," in that the indicated level is associated with the current instant level of the audio or with a filtered version of the current audio level. For example, the live meter for each channel (and for each region of the user interface 112) at any given time may indicate the average of the audio levels over the last N samples (where N may be any number of samples). This type of filtering is sometimes referred to as a moving-window low-pass filter, where the length of the window is N.

The controller 110 or the MCU 1005 may select which live meter mode (Mode A or Mode B) the user interface 112 operates in, and may control the LEDs 1302 in accordance with the selected live meter mode. The live meter mode of the user interface 112 may be selected based on user input (e.g., a double-tap on the touch-sensitive region(s) 1305 may switch between live meter modes), or automatically selected based on how many channels of audio are detected, received, and/or sent (such as via the USB connector 111) by the microphone, or based on a signal from the device 802 via the USB connector 111, which may be based on user interaction with the user interface 1100 displayed by the device 802. For example, if only one audio channel is being detected or received by the microphone (or being sent by the microphone), then live meter Mode A may be selected and operated. However, if two (e.g., left and right) audio channels are being detected or received by the microphone (or being sent by the microphone), then live meter Mode B may be selected and operated. The microphone may switch between Mode A and Mode B dynamically over time based on the user input or automatically based on the number of audio channels being detected, received, and/or sent by the microphone.

While a USB connection is discussed between the microphone 700 or 1200 and the device 802, other types of wired or wireless connections may be used. For example, the connection between microphone 700 or 1200 and device 802 may instead be a wireless connection, such as a Wi-Fi connection, a BLUETOOTH connection, a near-field connection (NFC), and/or an infrared connection. Where the connection is wireless, microphone 700 or 1200 and device 802 may include a wireless communications interface. Also, while particular types of connectors are discussed (XLR connectors, USB connectors, TRS connectors, and TRRS connectors), these are by way of example only; this description is not limited to these particular types of connectors, and any other types of connectors may be used in their place, as desired.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A microphone comprising:

a microphone element;

a user interface that is selectively operable in a first audio meter mode and in a second audio meter mode;

a housing comprising the microphone element and the user interface;

an analog connection port; and a digital connection port, wherein in the first audio meter mode, the user interface is configured to display a first audio meter indicating a combined level of both a first audio signal based on sound detected by the microphone element and a second audio signal received via the analog connection port, wherein in the second audio meter mode, the user interface is configured to display a second audio meter indicating a level of the first audio signal and a third audio meter indicating a level of the second audio signal, and wherein the microphone is configured to output, via the digital connection port and while the user interface is in each of the first audio meter mode and the second audio meter mode, audio of the first audio signal and audio of the second audio signal as separate audio channels.

2. The microphone of claim 1, wherein:

the user interface comprises a plurality of light-emitting diodes, in the first audio meter mode, the user interface is configured to display the first audio meter using the plurality of light-emitting diodes, and in the second audio meter mode, the user interface is configured to display the second audio meter using a first subset of the plurality of light-emitting diodes and the third audio meter using a second subset, different from the first subset, of the plurality of light-emitting diodes.

3. The microphone of claim 1, wherein:

the user interface comprises a sequence of light-emitting diodes extending between a first point and a second point, in the first audio meter mode, the user interface is configured to display the first audio meter as a first bar that extends from the first point toward the second point by a length that depends on a level of both of the first audio signal and the second audio signal, and in the second audio meter mode, the user interface is configured to display:

the second audio meter as a second bar that extends, in a first direction using a first subset of the sequence of light-emitting diodes and by a length that depends on a level of the first audio signal; and the third audio meter as a third bar that extends in a second direction opposite the first direction using a second subset of the sequence of light-emitting diodes and by a length that depends on a level of the second audio signal.

4. The microphone of claim 3, wherein the sequence of light-emitting diodes is curved to conform to a shape of the housing.

5. The microphone of claim 1, wherein:

the user interface is configured to display at least one of the first audio meter, the second audio meter, or the third audio meter, using a color that is based on a digital signal received from another device via the digital connection port.

6. The microphone of claim 5, wherein the digital connection port comprises a universal serial bus (USB) connection port.

7. The microphone of claim 1, wherein in the second audio meter mode, the user interface is configured to display the second audio meter simultaneously with the third audio meter.

8. The microphone of claim 1, wherein the analog connection port comprises one or both of an XLR connector or a quarter-inch TRS connector.

9. The microphone of claim 1, wherein the microphone further comprises:

a controller at least partially enclosed by the housing and configured to selectively cause the user interface to display the first audio meter in the first audio meter mode, and the second audio meter and the third audio meter in the second audio meter mode.

10. The microphone of claim 1, wherein the microphone is configured to select, based on a digital signal received via the digital connection port, between the first audio meter mode and the second audio meter mode.

11. The microphone of claim 1, wherein the user interface comprises:

a plurality of light-emitting diodes, wherein the first audio meter, the second audio meter, and the third audio meter are displayed using at least some of the plurality of light-emitting diodes; and a touch-sensitive layer overlaying the plurality of light-emitting diodes, wherein the microphone is configured to selectively adjust a level of at least one of the first audio signal or the second audio signal in response to touch detected by the touch-sensitive layer.

12. The microphone of claim 11, wherein the microphone is configured to:

adjust a level of the first audio signal in response to a first touch gesture; and adjust a level of the second audio signal in response to a second touch gesture.

13. The microphone of claim 1, wherein the user interface comprises:

a plurality of light-emitting diodes, wherein the first audio meter, the second audio meter, and the third audio meter are displayed using at least some of the plurality of light-emitting diodes; and a touch-sensitive layer overlaying the plurality of light-emitting diodes, wherein the microphone is configured to mute at least one of the first audio signal or the second audio signal in response to touch detected by the touch-sensitive layer.

14. The microphone of claim 1, wherein the microphone is configured to automatically select between the first audio meter mode and the second audio meter mode based on a number of audio channels being received by the microphone.

15. The microphone of claim 1, further comprising:

a first preamplifier configured to amplify the first audio signal; and a second preamplifier, separate from the first preamplifier, configured to amplify the second audio signal received via the analog connection port.

16. A method comprising:

receiving, via a digital connection port of a microphone, a first digital signal from a device external to the microphone;

selectively operating, based on the first digital signal, a user interface of the microphone in a first audio meter mode and in a second audio meter mode;

in the first audio meter mode, causing the user interface to display a first audio meter indicating a combined level of both of a first audio signal based on sound detected by a microphone element of the microphone and a second audio signal received via an analog connection port of the microphone from an audio source external to the microphone;

in the second audio meter mode, causing the user interface to display a second audio meter indicating a level of the first audio signal and a third audio meter indicating a level of the second audio signal; and providing, via the digital connection port, during each of the first audio meter mode and the second audio meter mode, audio of the first audio signal and audio of the second audio signal as separate audio channels.

17. The method of claim 16, wherein:

the user interface comprises a plurality of light-emitting diodes, in the first audio meter mode, displaying the first audio meter comprises displaying the first audio meter using the plurality of light-emitting diodes, and in the second audio meter mode, displaying the second audio meter comprises displaying the second audio meter using a first subset of the plurality of light-emitting diodes and displaying the third audio meter comprises displaying the third audio meter using a second subset, different from the first subset, of the plurality of light-emitting diodes.

18. The method of claim 16, wherein:

the user interface comprises a sequence of light-emitting diodes extending between a first point and a second point, in the first audio meter mode, displaying the first audio meter comprises displaying a first bar that extends from the first point toward the second point by a length that depends on a level of both of the first audio signal and the second audio signal, and in the second audio meter mode, displaying the second audio meter and the third audio meter comprises:

displaying the second audio meter as a second bar that extends in a first direction using a first subset of the sequence of light-emitting diodes and by a length that depends on a level of the first audio signal; and displaying the third audio meter as a third bar that extends in a second direction opposite the first direction using a second subset of the sequence of light-emitting diodes and by a length that depends on a level of the second audio signal.

19. The method of claim 16, further comprising receiving a second digital signal via the digital connection port, wherein displaying at least one of the first audio meter, the second audio meter, or the third audio meter comprises displaying at least one of the first audio meter, the second audio meter, or the third audio meter using a color that is based on the second digital signal.

20. The method of claim 16, wherein the digital connection port comprises a universal serial bus (USB) connection port.

21. The method of claim 16, wherein displaying the second audio meter comprises displaying the second audio meter simultaneously with the third audio meter.

22. The method of claim 16, wherein the analog connection port comprises one or both of an XLR connector or a quarter-inch TRS connector.

23. The method of claim 16, wherein the first audio signal is one of a left audio channel or a right audio channel, and wherein the second audio signal is the other of the left audio channel or the right audio channel.

24. The method of claim 16, wherein the user interface comprises:

a plurality of light-emitting diodes, wherein causing each of the first audio meter, the second audio meter, and the third audio meter to be displayed comprises causing at least some of the plurality of light-emitting diodes to be illuminated, and wherein the method further comprises selectively adjusting a level of at least one of the first audio signal or the second audio signal in response to detecting touching of the user interface.

25. The method of claim 24, wherein selectively adjusting the level of at least one of the first audio signal or the second audio signal comprises:

adjusting a level of the first audio signal in response to a first touch gesture; and adjusting a level of the second audio signal in response to a second touch gesture.

26. The method of claim 16, wherein the user interface comprises:

a plurality of light-emitting diodes, wherein causing each of the first audio meter, the second audio meter, and the third audio meter to be displayed comprises causing at least some of the plurality of light-emitting diodes to be illuminated, and wherein the method further comprises muting at least one of the first audio signal or the second audio signal in response to detecting touching of the user interface.

* * * * *